(12) United States Patent
Payne et al.

(10) Patent No.: US 11,661,269 B2
(45) Date of Patent: May 30, 2023

(54) VEHICLE TRANSPORT STRUCTURES

(71) Applicant: Trans-Rak International Limited, Warwick (GB)

(72) Inventors: Wesley Payne, Birmingham (GB); Martin Clive-Smith, Warwickshire (GB)

(73) Assignee: Trans-Rak International Limited, Warwick (GB)

( * ) Notice: Subject to any disclaimer, the term of this patent is extended or adjusted under 35 U.S.C. 154(b) by 690 days.

(21) Appl. No.: 16/497,772

(22) PCT Filed: Mar. 23, 2018

(86) PCT No.: PCT/GB2018/000045
§ 371 (c)(1),
(2) Date: Sep. 25, 2019

(87) PCT Pub. No.: WO2018/178610
PCT Pub. Date: Oct. 4, 2018

(65) Prior Publication Data
US 2020/0102143 A1 Apr. 2, 2020

(30) Foreign Application Priority Data

Mar. 27, 2017 (GB) .................................... 1704867
Apr. 5, 2017 (GB) .................................... 1705447
(Continued)

(51) Int. Cl.
*B60P 3/07* (2006.01)
*B65D 85/68* (2006.01)
(Continued)

(52) U.S. Cl.
CPC ............... *B65D 85/68* (2013.01); *B60P 3/07* (2013.01); *B60P 3/08* (2013.01); *B60P 7/13* (2013.01);
(Continued)

(58) Field of Classification Search
CPC ...... B60P 3/07; B60P 3/08; B60P 7/13; B60P 1/6409
(Continued)

(56) References Cited

U.S. PATENT DOCUMENTS 4,310,271 A * 1/1982 Canellis .................... B60P 3/07
410/24
5,924,248 A * 7/1999 Cox .......................... B60P 3/08
410/24
(Continued)

FOREIGN PATENT DOCUMENTS

CN 206476335 U 9/2017
EP 3048067 A1 7/2016
(Continued)

OTHER PUBLICATIONS

International Search Report and Written Opinion issued in application No. PCT/GB2018/000045 dated Jul. 31, 2018.
(Continued)

*Primary Examiner* — Stephen T Gordon
(74) *Attorney, Agent, or Firm* — Troutman Pepper Hamilton Sanders LLP; Ryan A. Schneider; Korbin M. Blunck

(57) ABSTRACT

A support structure for supporting vehicles one above the other during transport or storage, the structure comprising a base frame having four corner posts extending generally vertically when in use to support a separate upper frame on which an upper vehicle can be supported in an elevated transport position, and one or more separate lower frames
(Continued)

arranged to be positioned within the base frame when in use on which a lower vehicle can be supported. The upper frame is guided up the corner posts when the upper vehicle is raised to the elevated transport position. The base frame, upper and lower frames are transportable in a collapsed state when not in use by folding the corner posts down and collapsing the base frame, upper frame and lower frame so that they occupy less space with the upper, and lower and base frames in a nested configuration.

30 Claims, 21 Drawing Sheets

(30) Foreign Application Priority Data

| Apr. 13, 2017 | (GB) | ........................................ | 1706034 |
| Aug. 2, 2017 | (GB) | ........................................ | 1712410 |

(51) Int. Cl.
*B60P 3/08* (2006.01)
*B60P 7/13* (2006.01)
*B65D 88/12* (2006.01)

(52) U.S. Cl.
CPC .... *B65D 88/129* (2013.01); *B65D 2585/6867* (2013.01)

(58) Field of Classification Search
USPC ..... 410/4, 7, 13–15, 17–18, 24–27, 29.1, 30
See application file for complete search history.

(56) References Cited

U.S. PATENT DOCUMENTS

| 6,196,776 | B1* | 3/2001 | Pienaar | ..................... | B60P 3/08 |
| | | | | | 410/24 |
| 10,632,894 | B2* | 4/2020 | Andre | ....................... | B60P 3/08 |
| 2009/0080992 | A1* | 3/2009 | Dusik | ........................ | B60P 3/08 |
| | | | | | 410/26 |
| 2016/0137121 | A1* | 5/2016 | Clive-Smith | ............. | B60P 3/08 |
| | | | | | 410/24 |

FOREIGN PATENT DOCUMENTS

| FR | 3046577 A1 | 7/2017 |
| WO | 02057113 A1 | 7/2002 |

OTHER PUBLICATIONS

European Search Report issued in application No. GB1712410.8 dated Jan. 31, 2018.

* cited by examiner

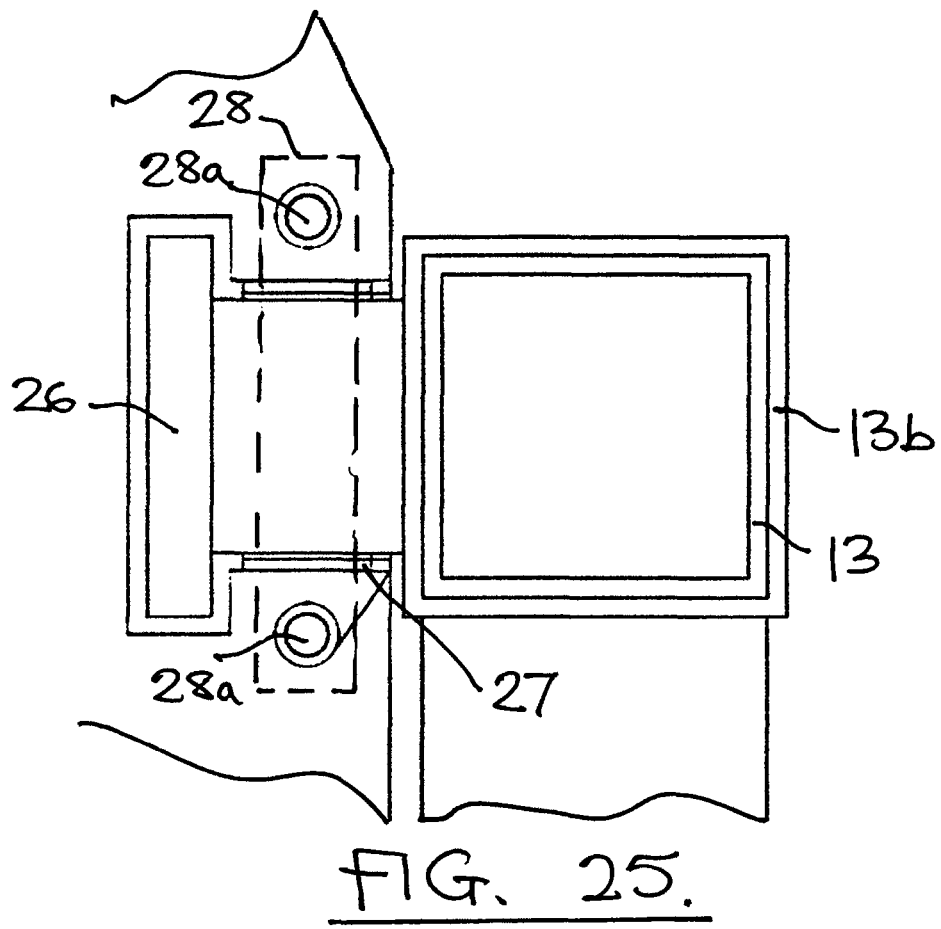
FIG. 25.
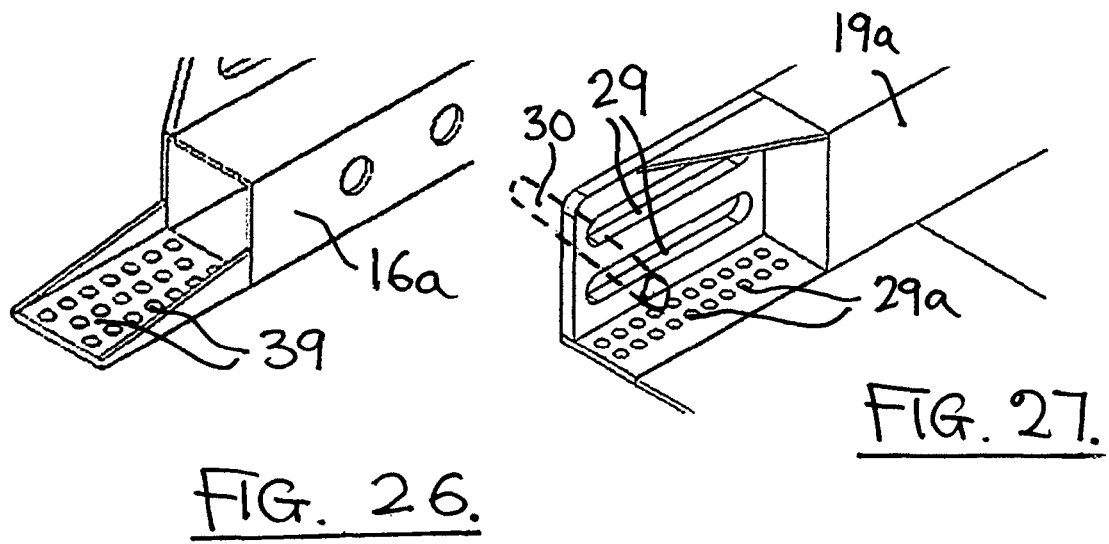
FIG. 26.
FIG. 27.

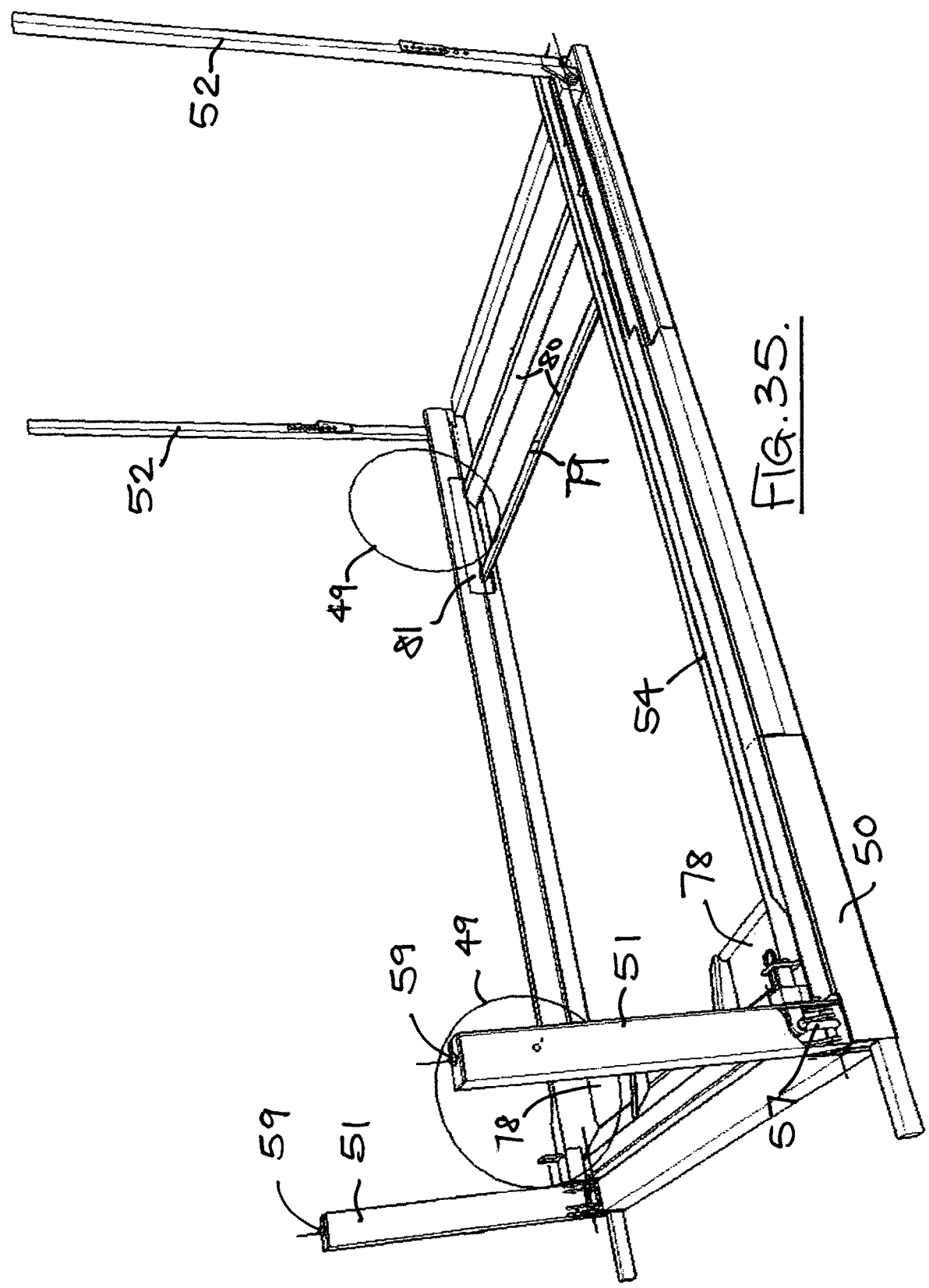

VEHICLE TRANSPORT STRUCTURES

This invention relates to support structures for supporting vehicles one above the other in shipping containers or on trailers for delivery to customers or in vehicle storage areas.

Such structures are well known and are basically of two types. A first type in which the support structure is secured to the inside of a shipping container and the upper vehicle of each pair is then loaded onto the structure in the container and then raised into its upper transport position using winches or other means thus necessitating the operators who are loading the vehicle working below the upper vehicle whilst it is being raised and secured in its transport position prior to the loading of the lower vehicle below. In the second type of structure at least the upper vehicle of each pair is loaded onto the structure and raised into an at least partially raised position outside the shipping container and the structure is then loaded into the container and the lower vehicle is then loaded below the upper vehicle using a forklift or similar machine without the operator needing to work below the raised upper vehicle at any point.

Both types of structure have their advantages and disadvantages. The main concern regarding the first type of structure is the necessity for operators loading the upper vehicle to work beneath the upper vehicle whilst it is being raised and secured into its transport position. On the other hand such structures tend to be less bulky and thus, more easily and economically transported back to their home port when not in use. The second type of structure whilst safer to use suffers significantly from being more bulky to transport back to its home port when not in use making such structures considerably less economic to use.

It is an object of the present invention to provide a support structure of the second type which can be collapsed into considerably more compact volume for transport back to its home port when not in use.

Thus according to the present invention there is provided a support structure for supporting vehicles one above the other during transport or storage, the structure comprising a base frame having four corner posts extending generally vertically when in use to support a separate upper frame on which an upper vehicle can be supported in an elevated transport position, and one or more separate lower frames arranged to be positioned within the base frame when in use on which a lower vehicle can be supported, the upper frame being guided up the corner posts when the upper vehicle is raised to its upper transport position and support means associated with the corner posts for fastening the upper frame in its transport position relative to the corner posts, the base frame, upper and lower frames being transportable in a collapsed state when not in use by folding the corner posts down and collapsing the base frame, upper frame and lower frame so that they occupy less space with the upper, and lower and base frames in a nested configuration.

Such a structure can be used to support vehicles one above the other in shipping containers, on vehicle trailers or in vehicle storage areas.

The separate lower frame or frames can be moved to a location outside the base frame and then loaded with the lower vehicle and moved to a location within the base frame for transportation.

The base frame may have two spaced side members which extend longitudinally of the structure and carry the corner posts, the side rails being joined at one end by a cross member. The upper and lower frames may each have side rails which extend longitudinally of the structure and are connected at each end by support areas for the front and rear wheels of the upper and lower vehicles respectively. The upper and lower frames may be of the same configuration. Thus either frame can be used as an upper or lower frame.

The corner posts may fold down transversely relative to, for example, a shipping container or trailer in which the structure is located when the structure is not in use. Alternatively the corner posts may fold down longitudinally relative to the container or trailer when the structure is not in use. In a further variant two of the corner posts fold down longitudinally relative to a shipping container and two of the corner posts fold down transversely relative to the container in which the structure is located when the structure is not in use.

Either of these alternatives gives a structure which is particularly compact. The corner posts may be folded transversely by rotating the side members of the base frame inwardly relative to the cross member so that the corner posts are turned inwardly to lie in a horizontal plane containing the side members.

The corner posts have bracing struts which resist shunting loads acting on the structure when in use.

The upper frame may be pivotally mounted on two of the corner posts by support means in the form of sleeves which slide up and down the corner posts and which have holes through which bolts or pins can extend into holes provided in the sides of the corner posts to allow adjustment of the vertical position of the one end of the upper frame on the posts. One end of the upper frame may be pivotally mounted on the two posts by two hooks on the end of the upper frame which are hooked around a projection extending from each respective sleeve. The other end of the upper frame may have one or more slots through which bolts or pins can extend into holes provided in the sides of the other two corner posts to allow adjustment of the vertical position of the other end of the upper frame on the posts.

The side members of the base frame and the upper and lower frames may be longitudinally telescopic to accommodate different vehicle wheel bases and for collapsing to occupy less longitudinal space when not in use.

The longitudinal telescopic adjustment of the length of the side members of the base frame and/or the upper and lower frame members may be provided by bolts or pins which extend through one of an array of adjacent holes in one telescopic part and a chosen one of a series of differently spaced holes in a cooperating telescopic part to give fine adjustment of the effective length of the telescopic parts.

Bolts or pins extending through one of an array of holes provided in each sleeve and a chosen one of a series of differently spaced holes in the cooperating corner post may be used to give fine adjustment of the height of the sleeve on the post.

The invention also provides a support structure in which two of the corner posts at one end of the base frame are designed to act as struts and take mainly static vertical loads generated by the raised upper vehicle and the other two corner posts at the other end of the base frame are designed to act as main corner posts and take vertical, transverse and longitudinal loads generated by the raised upper vehicle.

The two strut corner posts may fold longitudinally relative to the base frame and the other two main corner posts at the other end of the base frame preferably fold transversely but may fold longitudinally relative to the base frame.

The upper frame has a wheel support area for two wheels of the upper vehicle at one end and the other wheel support area is moveable longitudinally relative to the upper frame to allow upper vehicles of different wheel bases to be carried on the upper frame without the upper frame needing to be telescopic.

The corner posts at the end of the base frame to be positioned nearest the closed end of the container are provided with raising means for raising the upper frame relative to these corner posts. This raising means may be a vertical screw and nut mechanism or any other suitable raising means such as chain hoists, hydraulic rams or electric motors.

One end of the upper frame may have spring-loaded latches which snap into or behind height adjustable abutments provided on the associated corner posts when the upper frame has been raised to its desired transport height. The other end of the upper frame may have a pair of latches which engage with the nuts of the vertical screw and nut mechanisms and thus the upper frame is raised via the contact between these latches and the vertically moveable nuts. The latches engaging the nuts may have forks which engage projections on the nuts of the screw and nut mechanisms.

The ends of the side members of the base frame may include telescopic extensions which when extended out of the side members contact end walls or posts of the container or similar extensions on adjacent support structures to form a continuous chain of support structures whose extensions contact each other to rigidly locate the support structures longitudinally within the container in which the support structures are being used.

The lower frame may comprise one or more lower vehicle wheel support dollys which extend between the side members of the base frame and are secured to the side members or to the floor of the container in which the support structure is being used.

In a structure having only one lower vehicle wheel support dolly on which the front or rear wheels of the lower vehicle are secured the lower vehicle can be loaded into the container by raising the wheels not on the dolly of the ground using a forklift truck or similar vehicle and then pushing the lower vehicle into the container on the one wheel support dolly.

Each wheel support area or wheel dolly may be provided with a strap attachment point to enable a wheel supported on the wheel support area or dolly to be lashed down by a strap extending over the top of the wheel.

The support structure may be designed to be collapsed and stacked with the base frame, upper frame and lower frame one above the other and so that a series of such stacked structures can in turn be stacked in a column one above the other in a shipping container and a series of such columns can be stacked one behind the other in the shipping container for transport to a required destination. Depending on the design of the support frame 30 or more of such vehicle support structures can be transported in a standard forty foot shipping container stacked in up to 5 columns.

The invention also provides a support structure for supporting vehicles one above the other during transport or storage, the structure including one or more telescopic sections to allow the structure to be transportable in a collapsed state when not in use, the length of the or each telescopic section being adjustable by providing bolts or pins which extend through one of an array of adjacent holes in one telescopic section and a chosen one of a series of differently spaced holes in a cooperating telescopic section to give fine adjustment of the effective length of the telescopic section.

The invention also provides a two part telescopic structural member in which the length of the structural member is adjustable by providing bolts or pins which extend through one of an array of adjacent holes in one telescopic part and a chosen one of a series of differently spaced holes in the other part of the structural member to give fine adjustment of the effective length of the structural member.

The invention further provides a method of loading an upper vehicle above a lower vehicle for transport in a shipping container, the method comprising providing a support structure comprising a base frame having two pairs of generally vertically extending corner posts on which an upper frame can support the upper vehicle in an elevated transport position, and one or more separate lower frames arranged to be positioned within the base frame on which the lower vehicle can be supported, raising one end of the upper vehicle on the upper frame to its transport position relative to the base frame on one pair of corner posts, loading the upper vehicle into the container on the base frame and upper frame with the other end of the upper vehicle clear of the ground but below its desired transport height relative to the base frame, raising the other end of the upper vehicle to its desired transport height when within the container, loading the lower vehicle onto the one or more lower frames at a location outside the container, and then loading the lower vehicle supported on the lower frame or frames into a position below the upper vehicle within the container.

Several embodiments of the present invention will now be described, by way of example only, with reference to the accompanying drawings in which:

BRIEF DESCRIPTION OF THE DRAWINGS

FIG. 25 shows a view from below of the pivotal mounting of the upper frame on the corner post sleeves;

FIGS. 26 and 27 show details of the ends of the side members of the base frame and the upper and lower frames respectively and how they can be secured to the floor of the shipping container or to the vertical corner posts;

FIG. 35 shows a perspective view of a still further alternative form of vehicle support structure in accordance with the present invention with corner posts which fold both transversely and longitudinally;

Referring to the drawings, FIG. 1 shows pairs of vehicles A1, B1 and A2, B2 loaded into a shipping container 10 on vehicle support structures 11 in accordance with the present invention.

Figure 1:
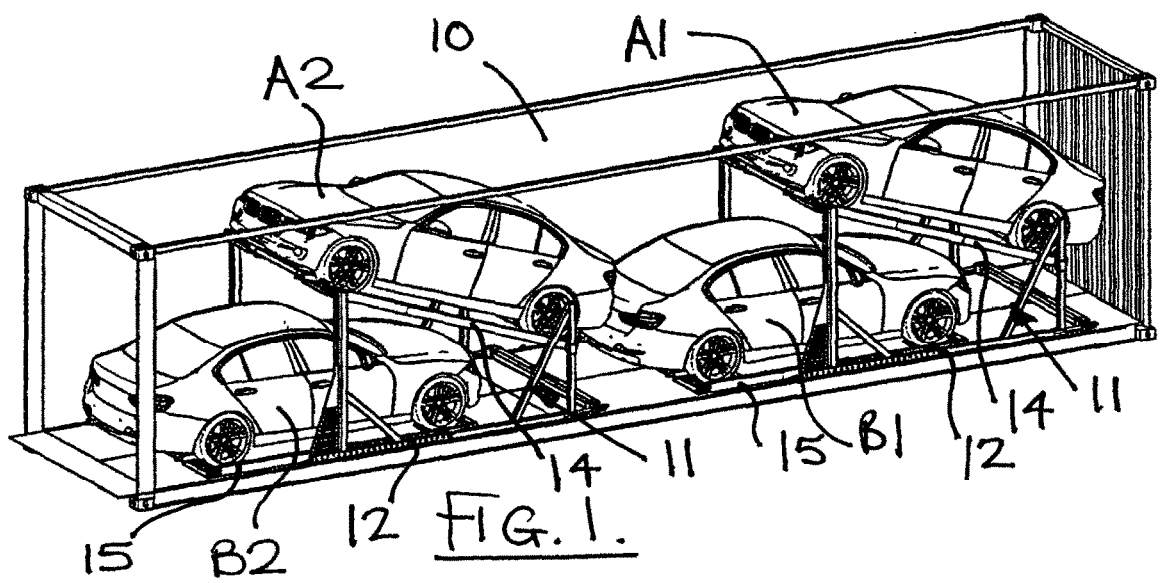
FIG. 1 shows pairs of vehicles A1, B1 and A2, B2 loaded one above the other in a shipping container on vehicle support structures in accordance with the present invention.
Figure 2:
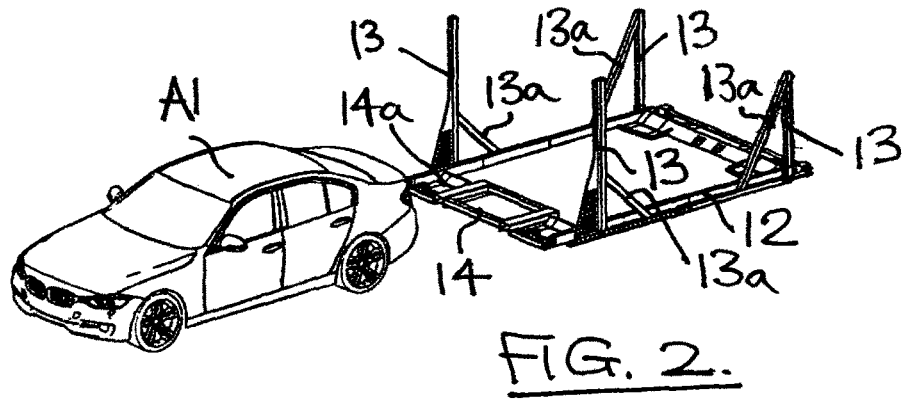
FIGS. 2 to 9 show various stages in the loading of the vehicles shown in FIG. 1.
Figure 3:
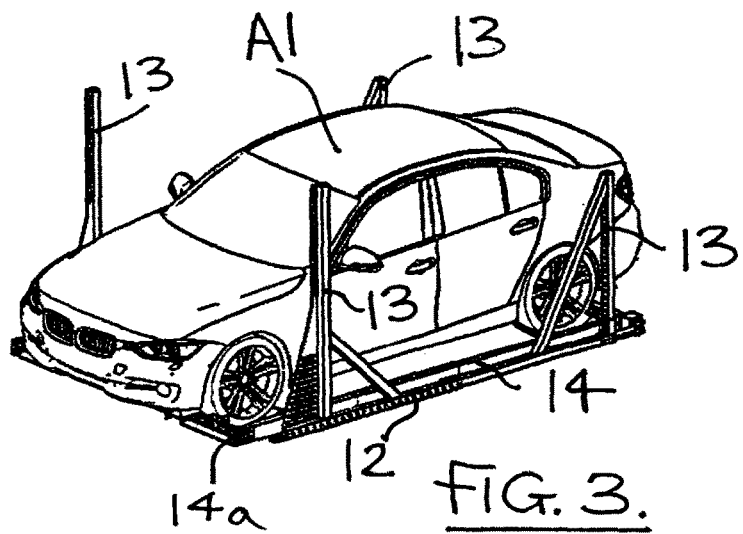
Figure 4:
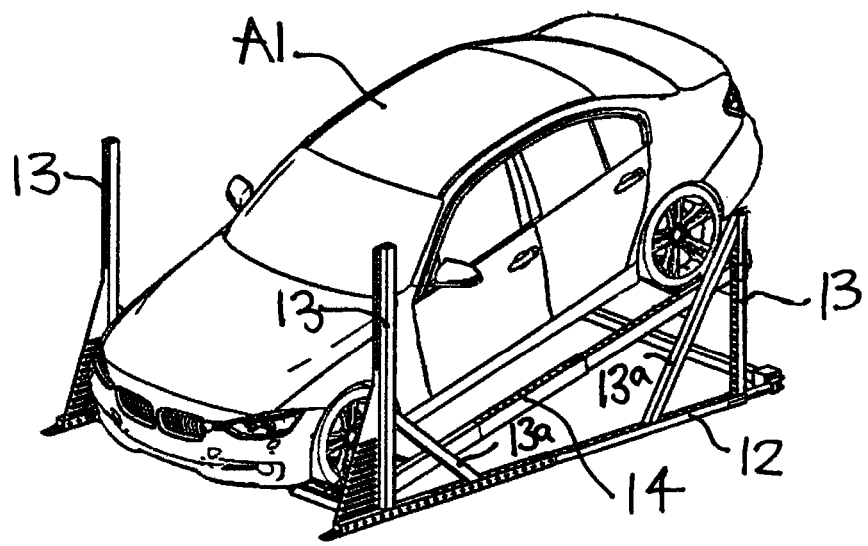

The sequence of loading of the vehicles A1, B1 and A2, B2 is shown in FIGS. 2 to 9 and will be described in detail later below.

Each support structure 11 has a base frame 12 having four corner posts 13 extending generally vertically when in use to support an upper frame 14 on which an upper vehicle A1 or A2 can be supported in an elevated position above a lower frame 15 arranged to be positioned within the base frame 12 when in use on which a lower vehicle B1 or B2 can be supported. The upper and lower frames each preferably have support areas 14a, 15a for the front and rear wheels of the upper and lower vehicles respectively. For maximum convenience the upper and lower frames 14 and 15 can be identical in construction so that they are fully interchangeable in their use.

Figure 13:
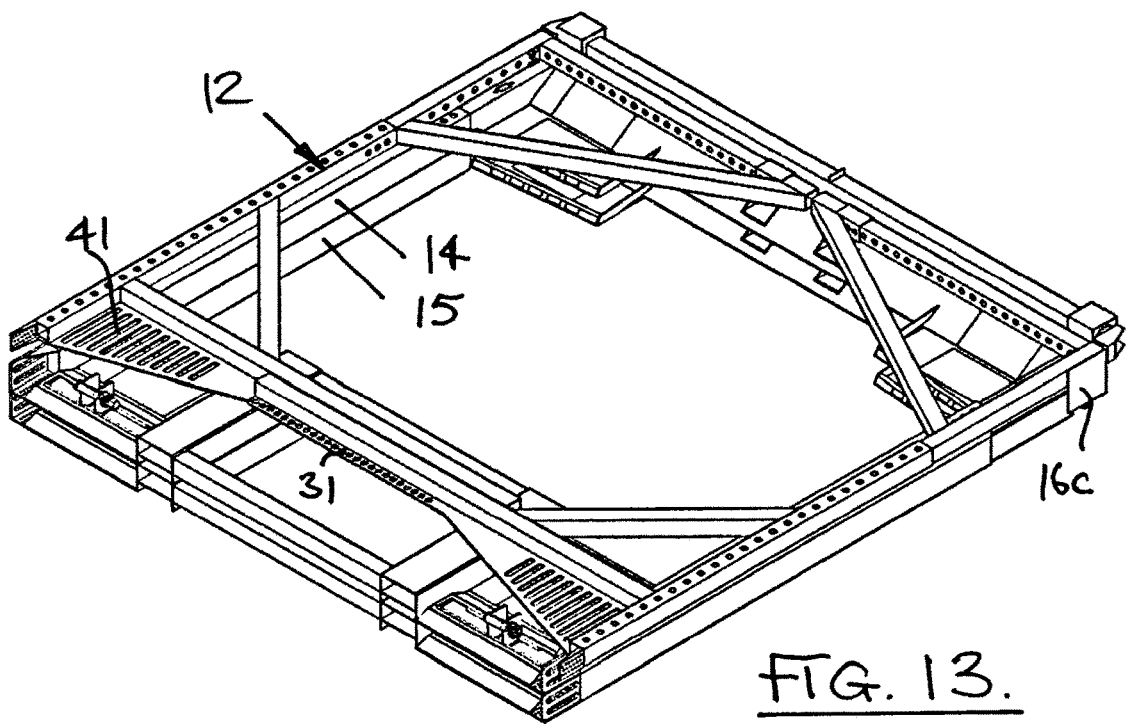
FIG. 13 shows the entire vehicle support structure stacked ready for transport with the base frame on top of the upper and lower frames.
Figure 14:
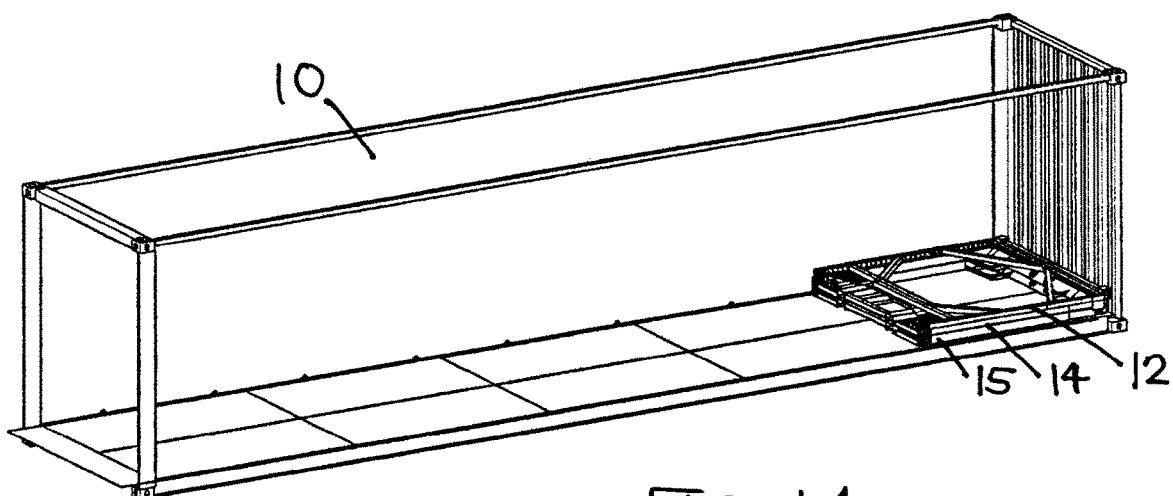
FIG. 14 shows the stacked structure of FIG. 13 loaded in the end of a shipping container.
Figure 15:
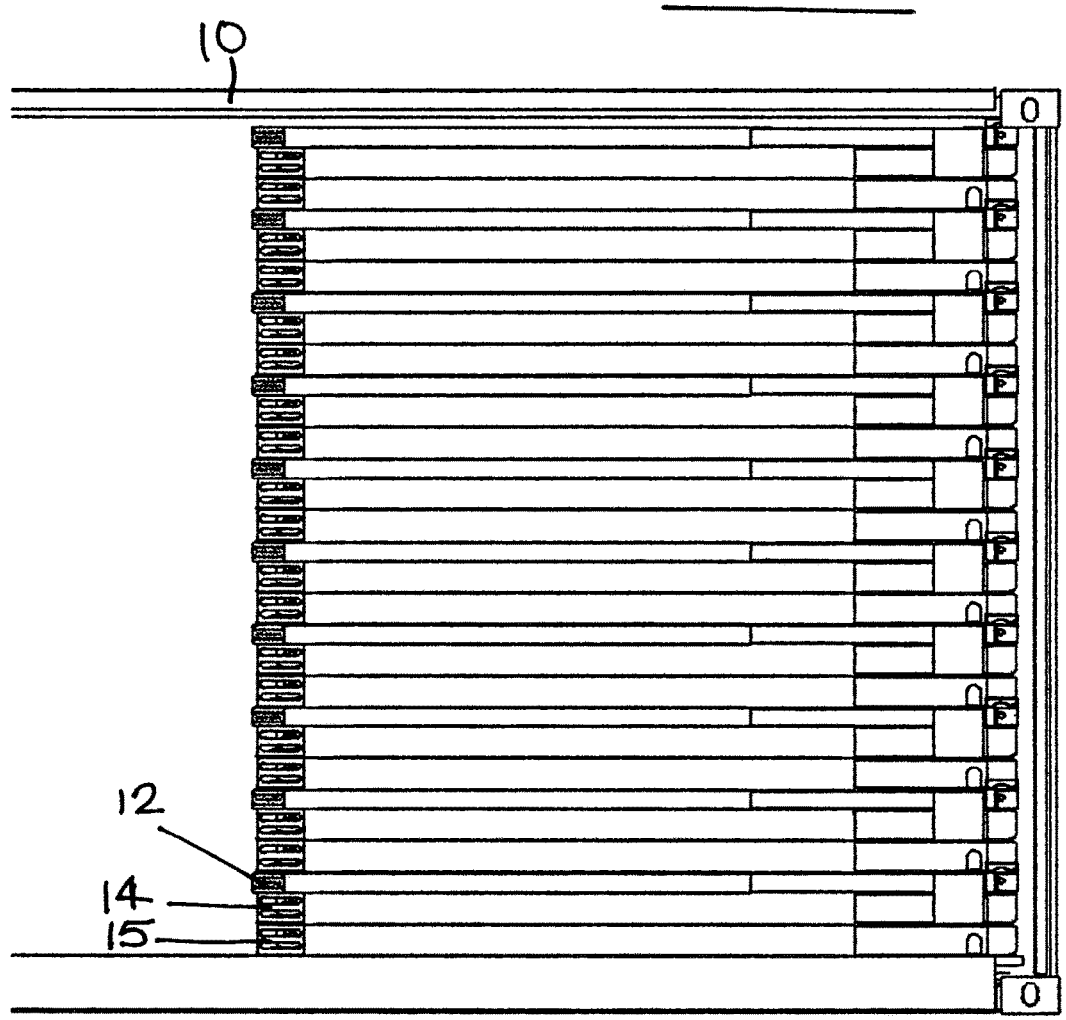
FIG. 15 shows how ten such stacked structures will fit one on top of the other in a column in a standard 40 foot shipping container.
Figure 16:
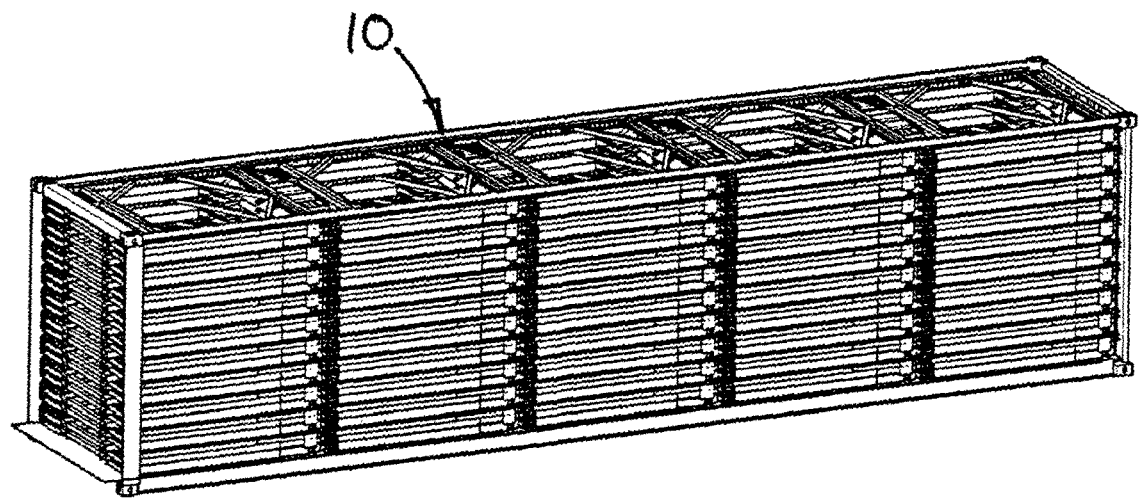
FIG. 16 shows how five such columns of stacked support structures can be transported in a standard 40 foot shipping container.

In accordance with the present invention, as will be described later in more detail, the base frame 12 and upper and lower frames 14, 15 are designed to be transportable in a collapsed state (see FIG. 13) when not in use by folding the corner posts 13 down and collapsing the base frame 12, upper frame 14 and lower frame 15 so that they occupy less space longitudinally relative to a shipping container with the upper and lower frames nested in a stacked configuration below or within the base frame. Typically five columns of eight or more stacked collapsed support structures can be housed in a standard 40 foot shipping container as shown in FIGS. 14 to 16.

Figure 10:
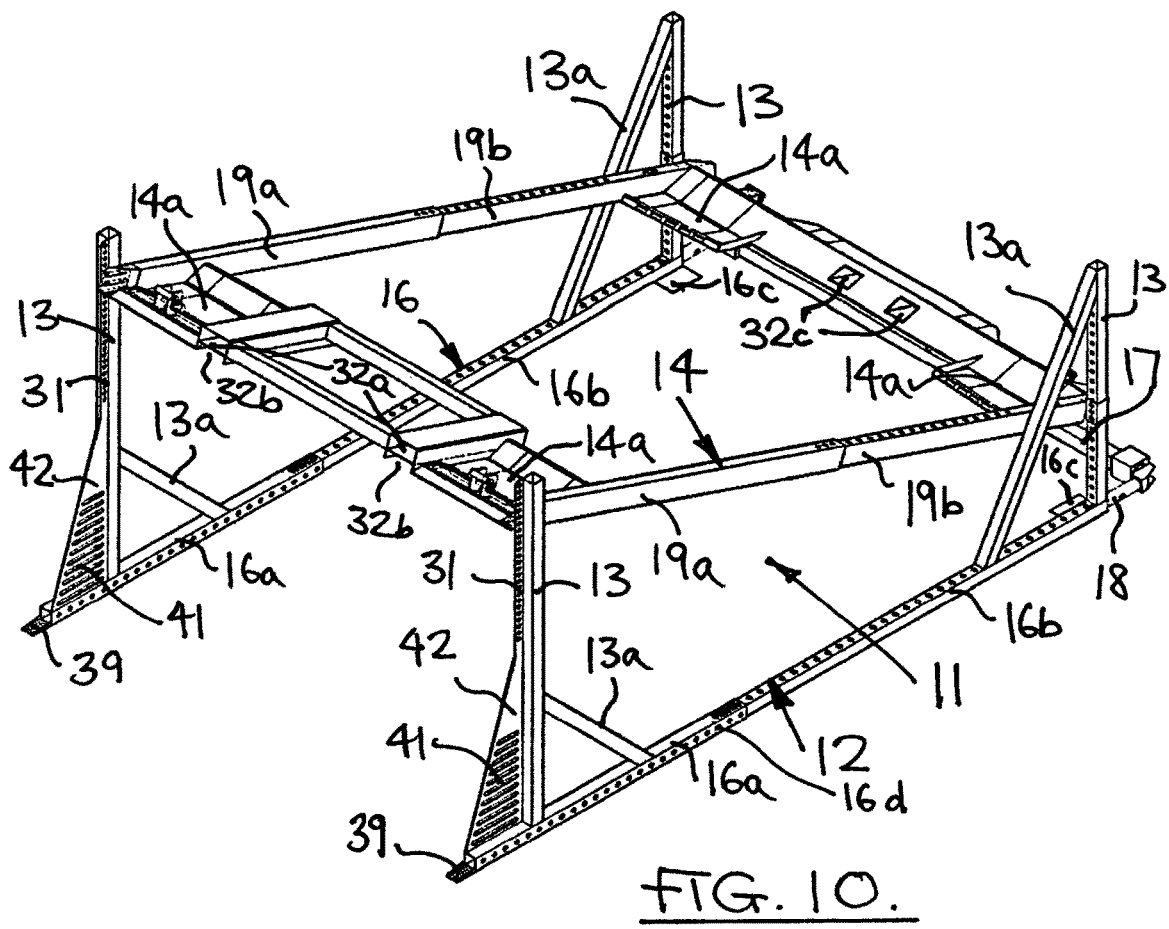
FIG. 10 shows part of the vehicle support structure used in FIGS. 1 to 9 with its upper frame raised into a transport position above its base frame and its lower frame omitted.
Figure 22:
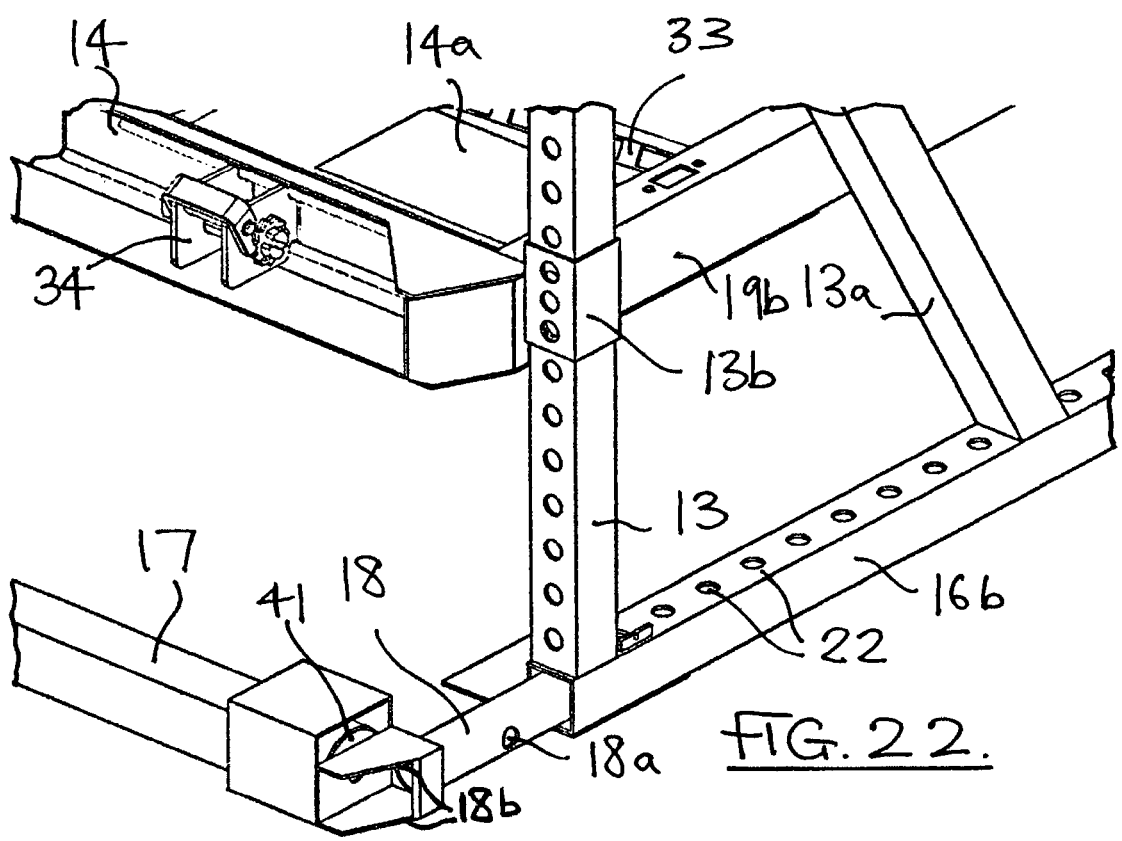
FIG. 22 shows details of one corner of the base frame and the support of the upper frame from the base frame corner posts.

The base frame 12 (see FIG. 10) has side members 16 arranged to extend longitudinally when in the container and are in two parts 16a and 16b which are arranged to be longitudinally telescopic for adjustment to suit the size of vehicle to be transported and for collapsing to occupy less longitudinal space when not in use. These side members 16 are connected at one end by a cross member 17 (see FIG. 22) which has projecting arms 18 which extend telescopically into the ends of side members 16.

The base frame posts 13 are supported on side members 16 by bracing struts 13a which resist shunting loads acting longitudinally relative to the container in which the structure is located during use of the structure.

Similarly the upper and lower frames 14 and 15 also have two part side members 19a, 19b (see FIG. 10) arranged to extend longitudinally when in the container and arranged to be longitudinally telescopic for adjustment to the size of the vehicle to be transported and for collapsing to occupy less longitudinal space when not in use.

Figure 20:
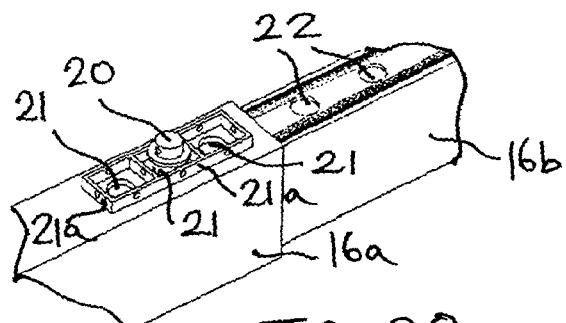
FIG. 20 shows details of a vernier-like pin fastening arrangement used on telescopic side members of the base frame.
Figure 23:
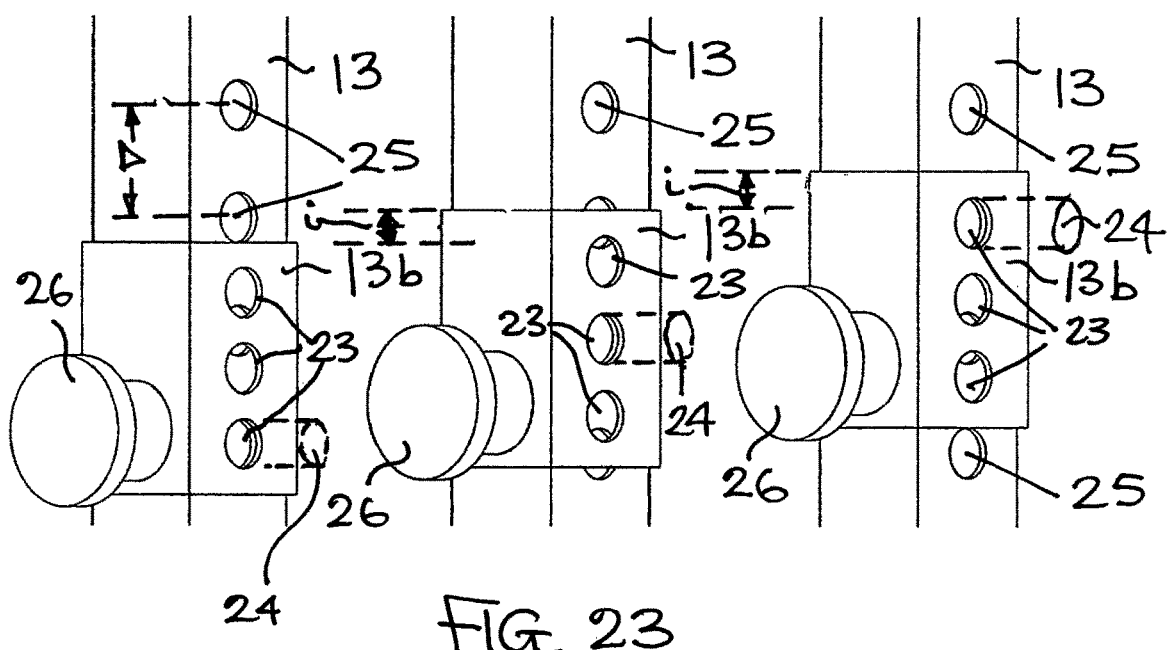
FIG. 23 shows details of the sleeve and pin arrangement used to provide a vernier-like adjustment of the height of the upper frame on its corner posts.

The longitudinal telescopic adjustment of the length of the side members 16a, 16b of the base frame 12 is provided by bolts or pins 20 (see FIG. 20) which extend through one of an array of adjacent holes 21 in one telescopic side member part 16a and a chosen one of a series of spaced holes 22 in a cooperating telescopic side member part 16b to give a vernier-like adjustment of the effective length of the side member. This vernier-like adjustment of side members 16 of the base frame 12 is also used to adjust the effective length of the side members 19a and 19b of the upper and lower frames 14 and 15 and the height of the upper frame 14 on the corner posts 13. The operating principle of this adjustment is described in detail below in relation to FIGS. 23 and 24 which show the arrangement used on the corner posts 13.

Figure 31:
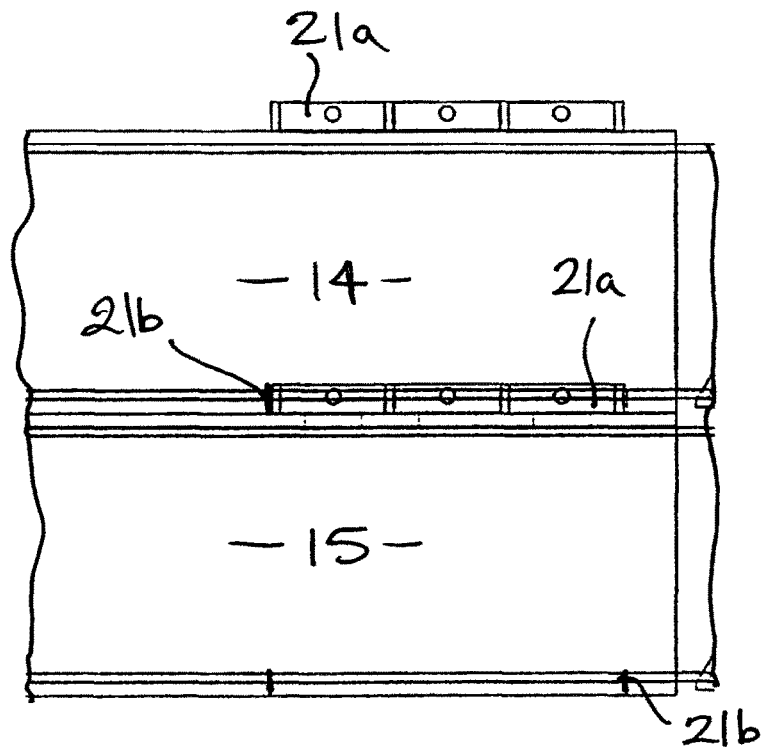
FIG. 31 shows the location of upper and lower frames when stacked.

The holes 21 in side members 19a are surrounded by a wall-like projection 21a (see FIG. 20) which cooperates with a cut out 21b in the underside of any adjacent and stacked upper/lower frame member 14, 15 to assist in retaining the frames in a stacked configuration when not in use (see FIG. 31).

Figure 11:
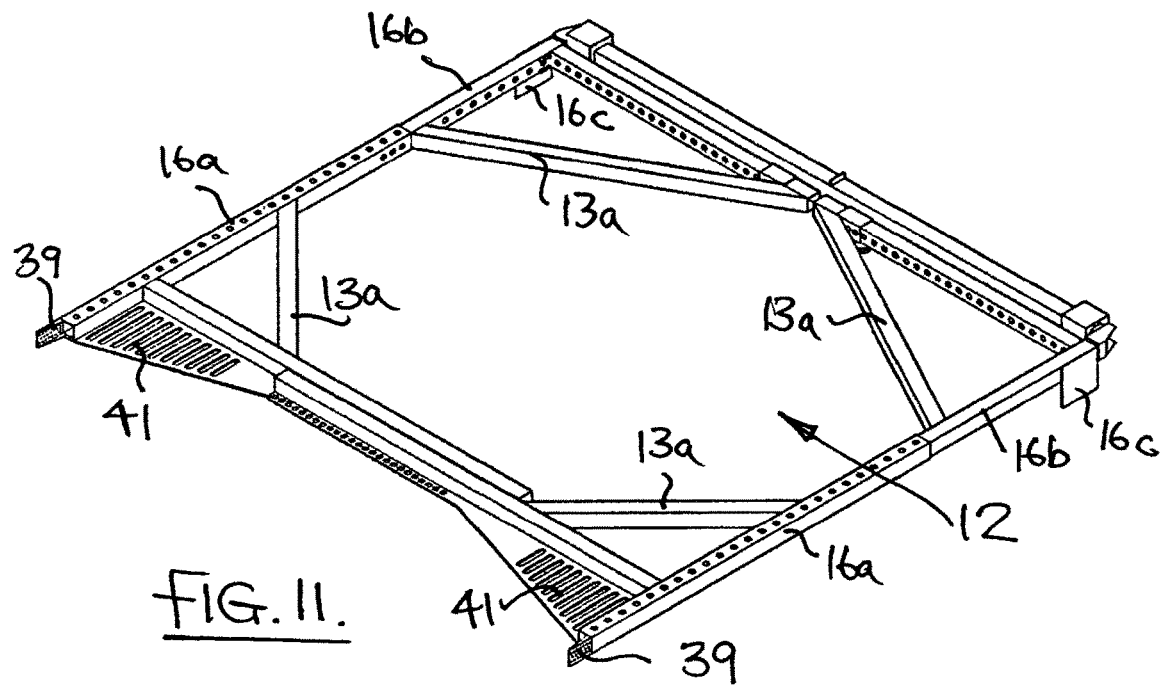
FIG. 11 shows the base frame of the vehicle support structure in its collapsed state.
Figure 12:
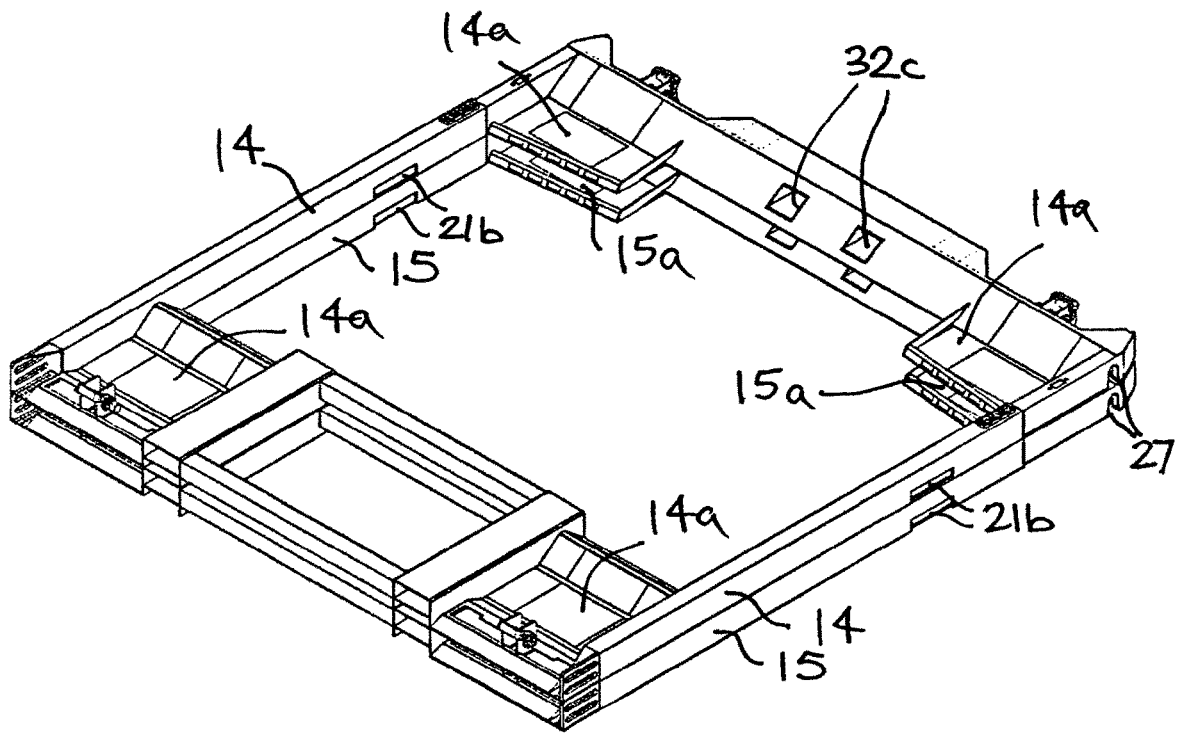
FIG. 12 shows the upper and lower frames of the vehicle support structure stacked one on top of each other ready for transport.

The base frame 12 is collapsed by telescoping side member parts 16b into parts 16a and by folding down the corner posts 13 of the base frame transversely (see FIG. 11) relative to the container in which the structure is located when the structure is not in use. This transverse folding of the corner posts is achieved by rotating the rectangular section side members 16a, 16b inwardly through 90 degrees on the projecting arms of cross member 17 which are of circular cross-section. The projecting arms 18 are then fully inserted into the ends of the side members 16b so that the base frame is fully collapsed as shown in FIG. 11. and pins inserted through holes 22 in side members 16b and holes 18a in projecting arms 18 to secure the cross member to the base frame 12 (see FIG. 22). By folding the corner posts by rotating the entire side members on the projecting arms 18 of cross member 17 the effective vertical dimension of the base frame remains the same when collapsed ready for stacking.

Alternatively the corner posts can be pivoted on side members 16 so that they can fold down longitudinally (see, for example, the construction shown in FIGS. 35 to 43) relative to the container in which the structure is located when the structure is not in use.

One end 19b of the side rails 19 of the upper frame 14 is pivotally mounted on two of the corner posts 13 by sleeves 13b which slide up and down the corner posts and which have holes 23 through which bolts or pins 24 can extend into holes 25 provided in the sides of the corner posts 13 to allow adjustment of the vertical position of the sleeves on the posts in a vernier-like manner similar to the adjustment of the side members 16a, 16b and 19a, 19b. The sleeves 13b have T-shaped projections 26 over which hook-like cut outs 27 in side member part 19b are hooked to allow the upper frame 14 to be pivoted relative to the corner posts 13 on which it is supported. Keepers 28 (see dotted detail 28 in FIG. 25) are secured over the open ends of cuts outs 27 via threaded bores 28a to prevent disengagement of the cut out 27 from the projections 26.

Figures 24A, 24B, 24C:
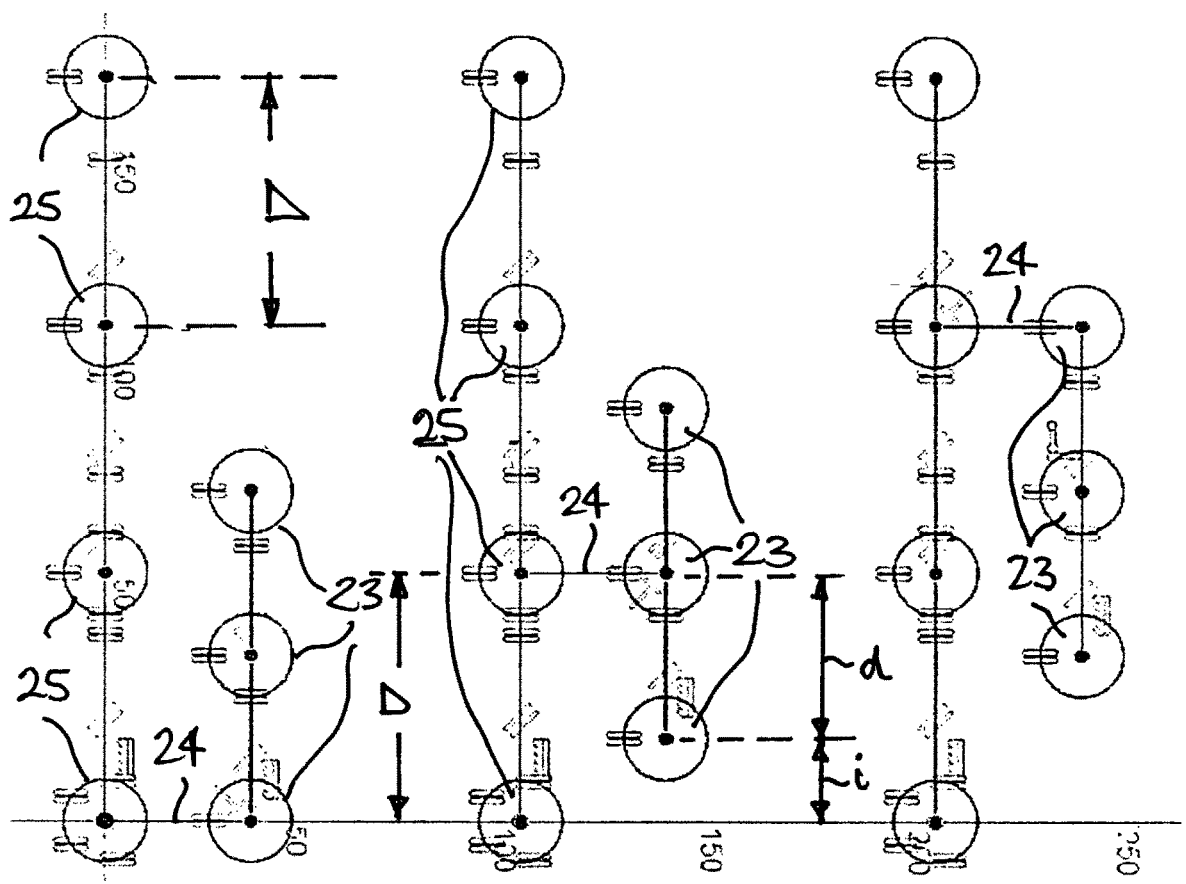
FIGS. 24A, B, C show diagrammatically the principle of operation of the vernier-like adjustment used on the side members and the corner post sleeves.

The principle of operation of the vernier-like adjustment of the position of the sleeves 13b on the corner posts 13 is shown diagrammatically in FIG. 24A to 24C. If the sleeve 13b only had one hole and the corner post had the series of spaced holes 25 then the height adjustment possible would simply be the distance "D" between the holes 25. By having multiple spaced holes 23 in the sleeve (in the example shown three holes) which are a distance "d" apart it can be seen from drawings 24A to 24C that the height of the sleeve 13b can be adjusted in much smaller increments of "i" where "i"=D−d and that since ideally d=D−D/N where N is the number of holes 23 in sleeve 13b then i=D−[D−(D/N)] i.e. i=D/N. Thus the flexibility of adjustment of the height of the vehicle on the upper frame is greatly increased.

The other end of the upper frame 14 has one or more slots 29 through which bolts or pins 30 can extend into holes 31 provided in the sides of the other corner posts 13 to allow adjustment of the vertical position of the other end of the upper frame on the posts. Slots 29 can also be used with bolts or pins 30 extending through slots 41 in post support gussets 42 during the early part of the raising of the upper frame 14 relative to the base frame 12 (see FIG. 10). Holes 29a are also provided through which screws, nails or other fastenings can be driven to secure the frame to the wooden floor of the container when in use as a lower frame.

Figure 18:
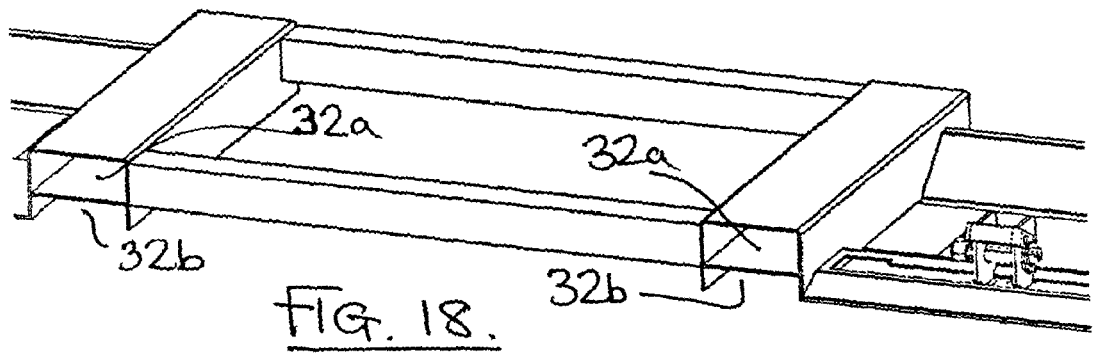
FIGS. 18, 19 and 21 show details of the other end of the upper/lower frames of the support structure showing fork lift lifting socket arrangements and vehicle wheel support areas.
Figure 19:
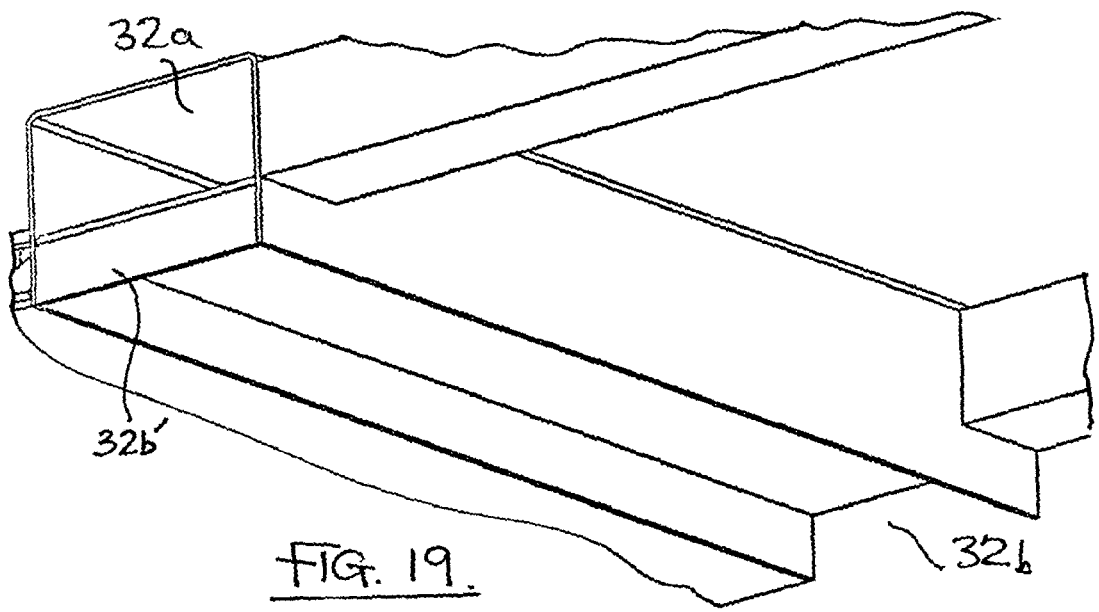

The ends of the upper and lower frames 14 and 15 are provided with lifting sockets 32a, 32b and 32c for the tines of forklifts or similar machines. As can be seen from FIGS. 18 and 19 one end of the upper and lower frames is may be provided with two sets of lifting sockets 32a and 32b, one set 32b being closed at one end 32b' to prevent the extending through the socket of the lifting tines leading to possible damage to the supported vehicle and the other set 32a of sockets being open ended.

Figure 21:
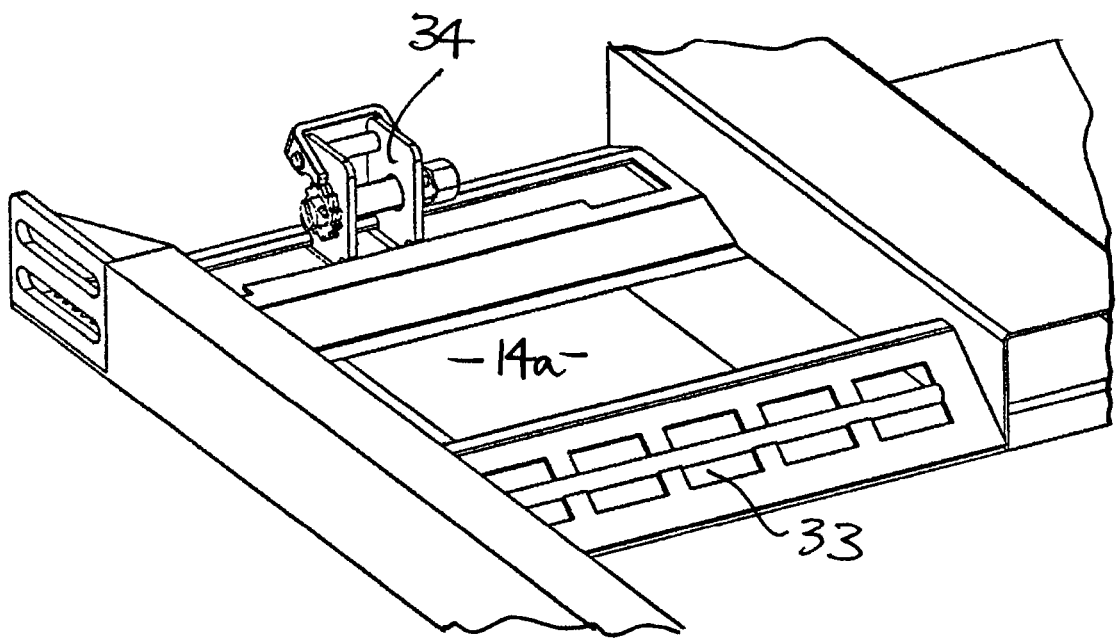

Each wheel support area 14a, 15a is provided with a strap attachment point 33 and a lashing winch 34 (see FIG. 21) to enable a wheel supported on the support area to be lashed down onto the support area by a strap extending over the top of the wheel. The wheel support areas 14a may be continuous sheet metal plates as shown in the drawings or may be of an open construction comprising, for example, two spaced bars which extend transversely relative to the container and allow the vehicle wheels to project partially between the bars allowing the vehicle to sit lower on the support frame so that the upper frame can be raised further leaving more room for the vehicle below. When used as a lower frame such spaced bars may be covered by a plate on which the lower vehicle tyres sit to protect the tyres from rubbing on the floor of the container.

The upper and lower frames are of an open construction (i.e. have no transverse beams between the side members at locations between the wheel support areas) so that any vehicle mounted below in the container can nest between the side members.

The base frame cross member 17 is adjustable telescopically relative to the remainder of the base frame to locate the base frame longitudinally within the container against an end wall of the container or an adjacent vehicle support structure.

Figure 28:
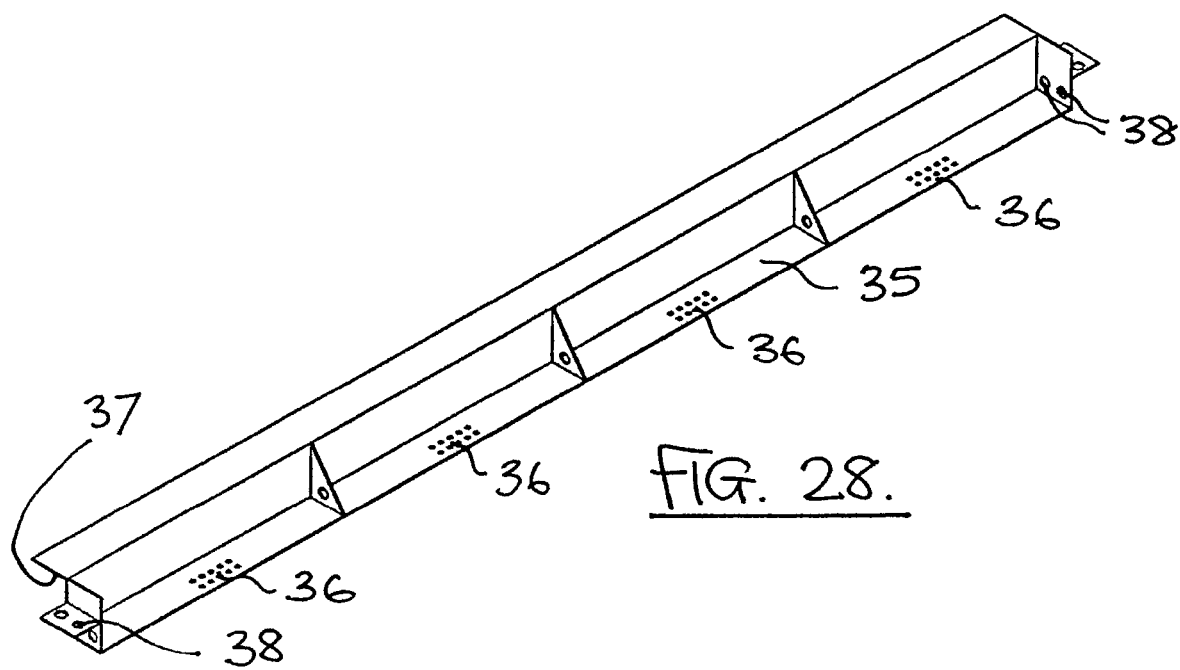
FIG. 28 shows details of a transversely extending chock which can be used to locate the base frame or lower frame against movement within the container.
Figure 32:
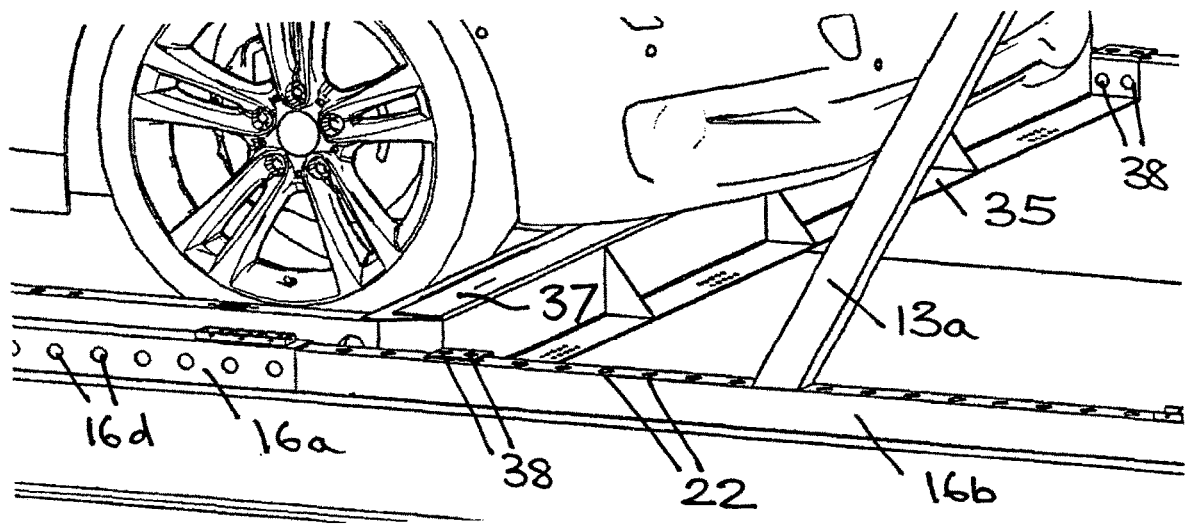
FIG. 32 shows a transversely extending chock fastened between the side members of the lower frame.

Alternatively the structure may be located longitudinally relative to the container by a transversely extending chock member 35 (see FIG. 28) which is screwed or otherwise secured to a wooden floor of the container via holes 36. The chock member has a flange 37 under which the cross member 17 can be located. This chock member 35 can also be used to locate the lower frame 15 relative to the base frame 12 by securing the chock member 35 transversely between side members 16 by bolts or pins extending through holes 38 on the chock member which engage either the holes 22 in the side members 16b or the side holes 16d in side members 16a as shown in FIG. 32. The base frame can also be secured to the wooden floor of the shipping container by nails, screws or other fixings which extend through holes 39 in the lower frame into the wooden floor of the container. Additional fastening plates 16c (see FIG. 10) are also provided on the base frame side members 16 having holes through which the base frame can again be secured to the floor of the container using nails, screws or other fastenings to hold the base frame down.

Both the cross member 17 and chock member 35 help prevent the frames rotating about a vertical axis when inside the container and thus reduce the likelihood of any supported vehicles contacting the internal walls of the container during transit. The chock member 35 with its flange 37 also prevents vertical movement of the frames within the container controlling bounce of the frames and their cargo.

Figure 17:
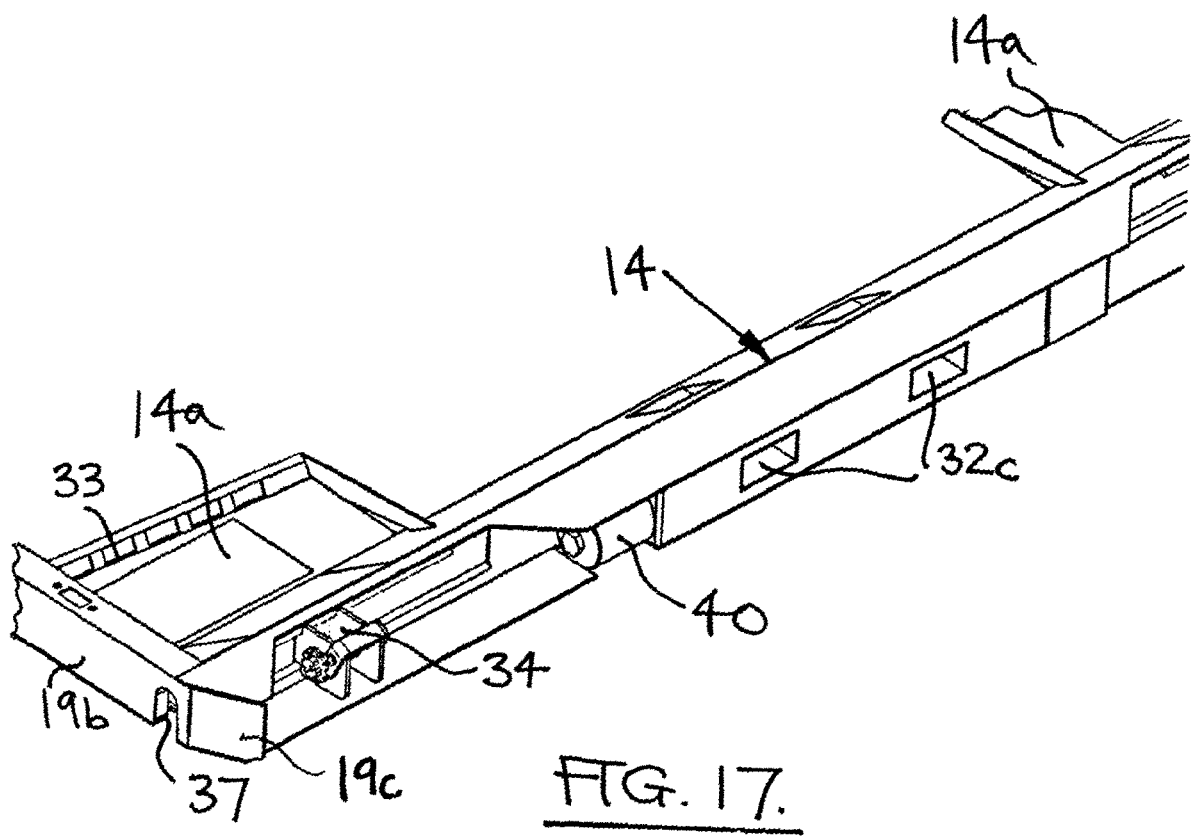
FIG. 17 shows details of one end of the upper/lower frames of the support structure showing rollers/wheels and vehicle wheel support areas.
Figure 29:
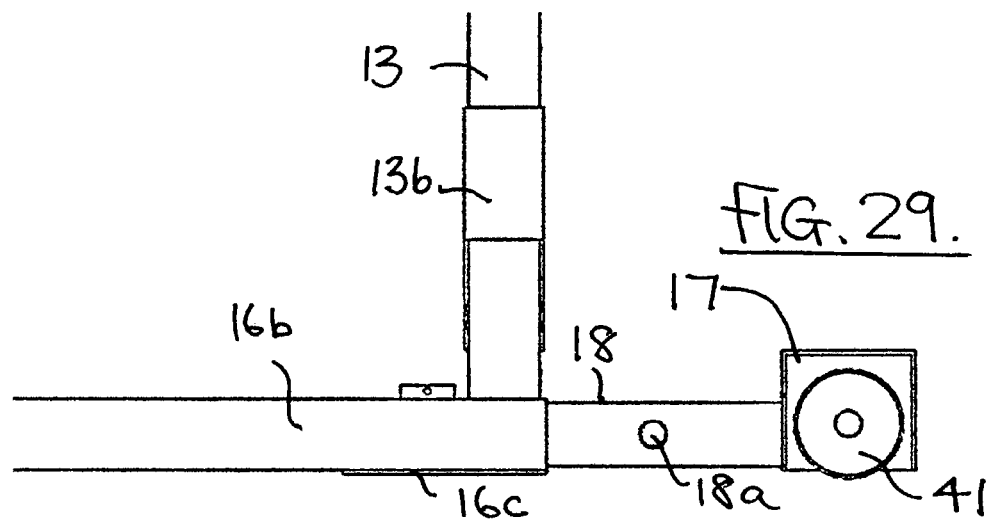
FIG. 29 shows details of a roller/wheel arrangement for the base frame of the support structure.
Figure 30A:
FIGS. 30A and 30B show diagrammatically how the rollers and wheels can be orientated to clear the ground/floor when the associated frame is level but operative when the associated frame is inclined for loading.
Figure 30B:

The base frame, upper frame and lower frame may be provided with rollers or wheels to allow these frames to be pushed into or pull out of a container with or without a vehicle loaded thereon. FIG. 17 shows such rollers/wheels 40 mounted on the end of the upper or lower frames 14, 15 and in FIG. 29 shows roller/wheels 41 mounted on cross member 17 of the base frame 12. These rollers/wheels 40, 41 are mounted, as shown diagrammatically in FIGS. 30A, 30B, so that if the upper, lower or base frame is resting level on the ground or floor of the container (FIG. 30A) the rollers/wheels are clear of the ground or floor so that the frame is stable and if one end of the frame is raised (FIG. 30B) the rollers/wheels contact the ground or floor to facilitate loading/unloading of the container.

The loading sequence shown in FIGS. 2 to 9 is as follows. Initially the upper frame 14 is mounted on the base frame 12 (see FIG. 2) via the hook like cut outs 27 and keepers 28 at one end and via bolts 30 extending through slots 41 in the base frame and slots 29 in the upper frame. A vehicle A1 is then reversed onto the upper frame 14 (FIG. 3) using temporary ramps if required and is strapped to the wheel support areas 14*a* using straps extending over the wheels between the strap attachment points 33 and the winches 34. The rear end of the vehicle is then raised (FIG. 4) using a forklift with its tines extending into sockets 33 to its intended transport height. The vehicle A1 is then loaded into the container using a fork lift engaging sockets 32*a* or 32*b* in the upper frame 14 with the front portion of the base frame raised by the forklift so that the rollers/wheels 41 of the base frame can engage the ground and container floor to facilitate loading to the position shown in FIG. 5. Angled guide surfaces 18*b* (see FIG. 22) on the corners of cross member 17 help to guide the base frame 12 into the container. Other guide members can be provided on the base frame if required. In the FIG. 5 position the cross member 17 of the base frame 12 engages under the flange 37 of a transversely extending chock member 35 which is screwed or otherwise fixed to the wooden floor of the container by screws or other fastening extending through holes 36. This chock member 35 controls longitudinal movement of the base frame towards the end of the container and thus prevents damage to the supported vehicle on the container wall. Alternatively, movement of the vehicle towards the end of the container can be controlled by extending the projecting arms 18 of the cross member 17 out of the side members 16*b* of the base frame into contact with the base of the end wall of the container. The base frame is also secured to the floor of the container by screws or other fastenings extending through holes 39 in side members 16*a*.

The front of the vehicle A1 is then raised to its transport position (FIG. 6) using a forklift F.

Figure 7:
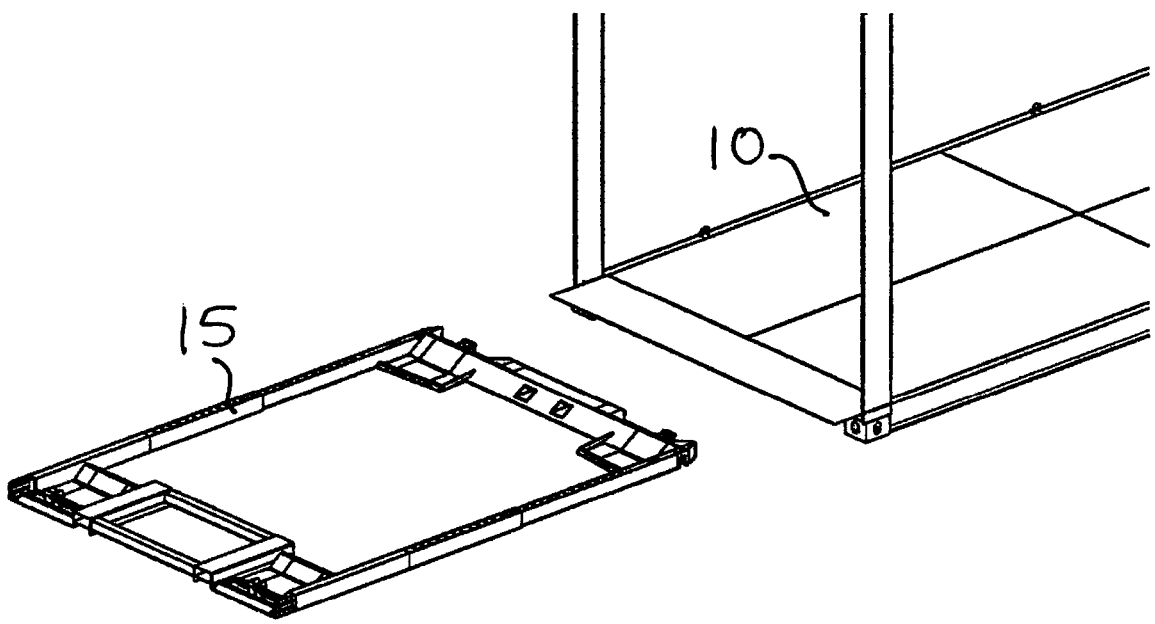
Figure 5:
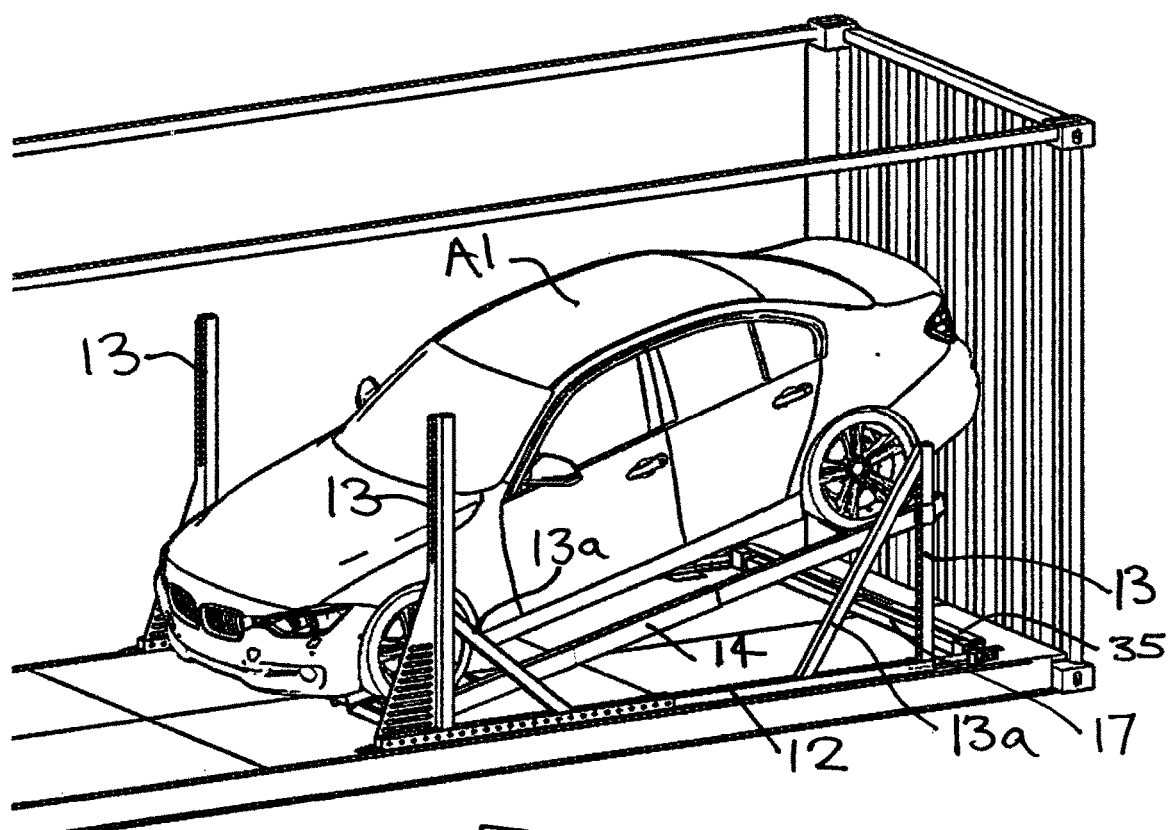
Figure 6:
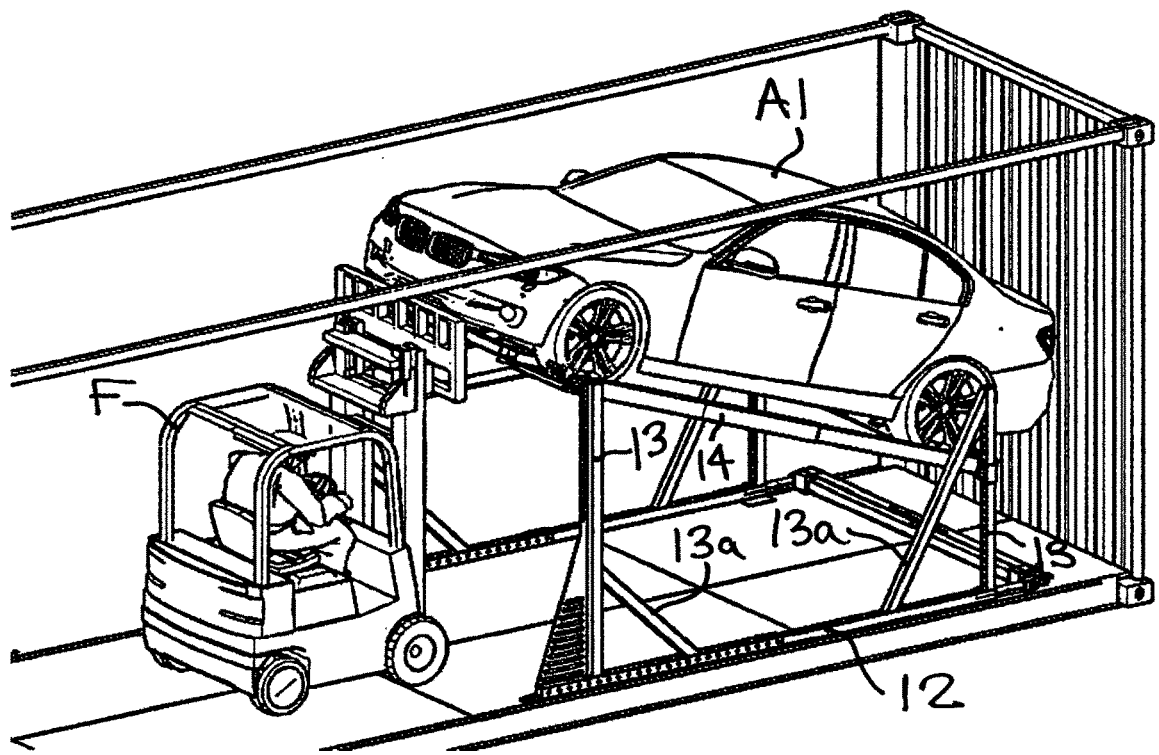
Figure 8:
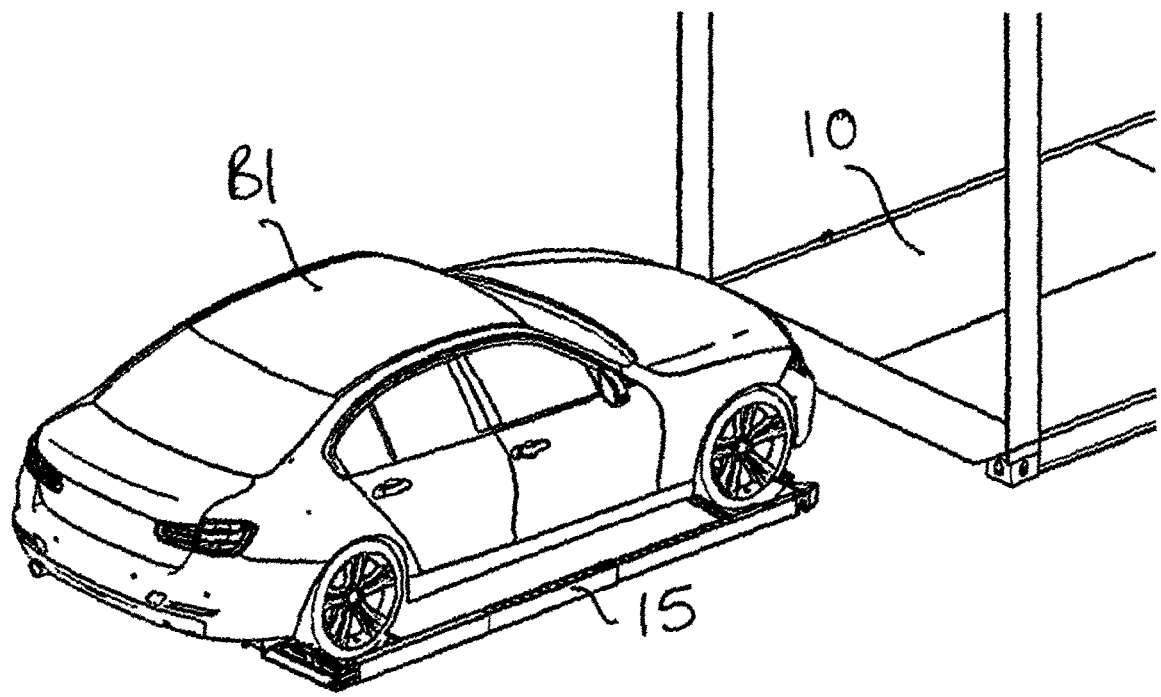
Figure 9:
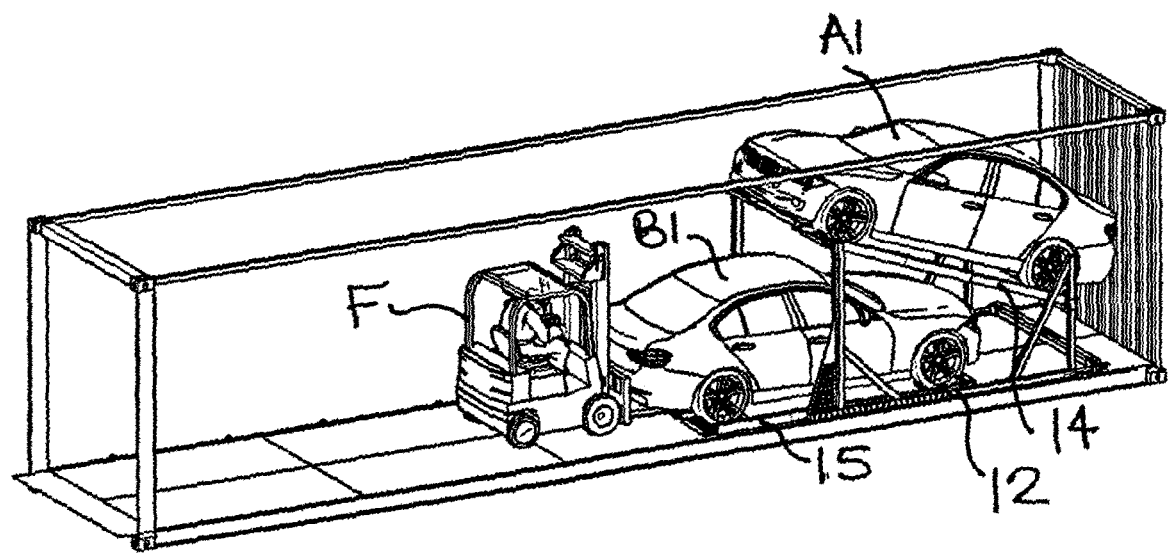

The lower frame 15 is then positioned outside the container as shown in FIG. 7 and vehicle B1 is driven onto the lower frame (FIG. 8) using temporary ramps if required and strapped to the wheel support areas 15*a* using the strap attachment points 33 and the ratchets 34. The rear of vehicle B1 is then raised clear of the ground by a forklift F engaging sockets 32*a* or 32*b* of frame 15 so that the rollers/wheels 40 of the lower frame 15 contact the ground to facilitate loading of the lower frame and vehicle B1 into a position below vehicle A1 as shown in FIG. 9. Angled guide surfaces 19*c* (see FIG. 17) on the lower frame 15 help to guide the lower frame into the base frame. Other guide members can be provided on the lower frame if required. The lower frame is then located longitudinally relative to the container/base frame by, for example, a chock member 35 (see FIG. 32) secured between the side members 16 of the base frame and by screws or other fastening extending through holes 29*a* in the lower frame.

The above loading sequence is then repeated to load vehicles A2 and B2 to the positions shown in FIG. 1.

The support structures described above can be used to load different numbers of vehicles into the shipping container. For example, three vehicles instead of the four shown in FIG. 1 can be loaded by not loading vehicle A2 and simply loading vehicle B2 on a lower frame member 15 secured to the floor of the container. Similarly five vehicles might be loaded where the length of the container or size of the vehicles permits by adding a fifth vehicle loaded on a lower frame member 15 to the vehicles A1, B1, A2, B2 described above.

Figure 33:
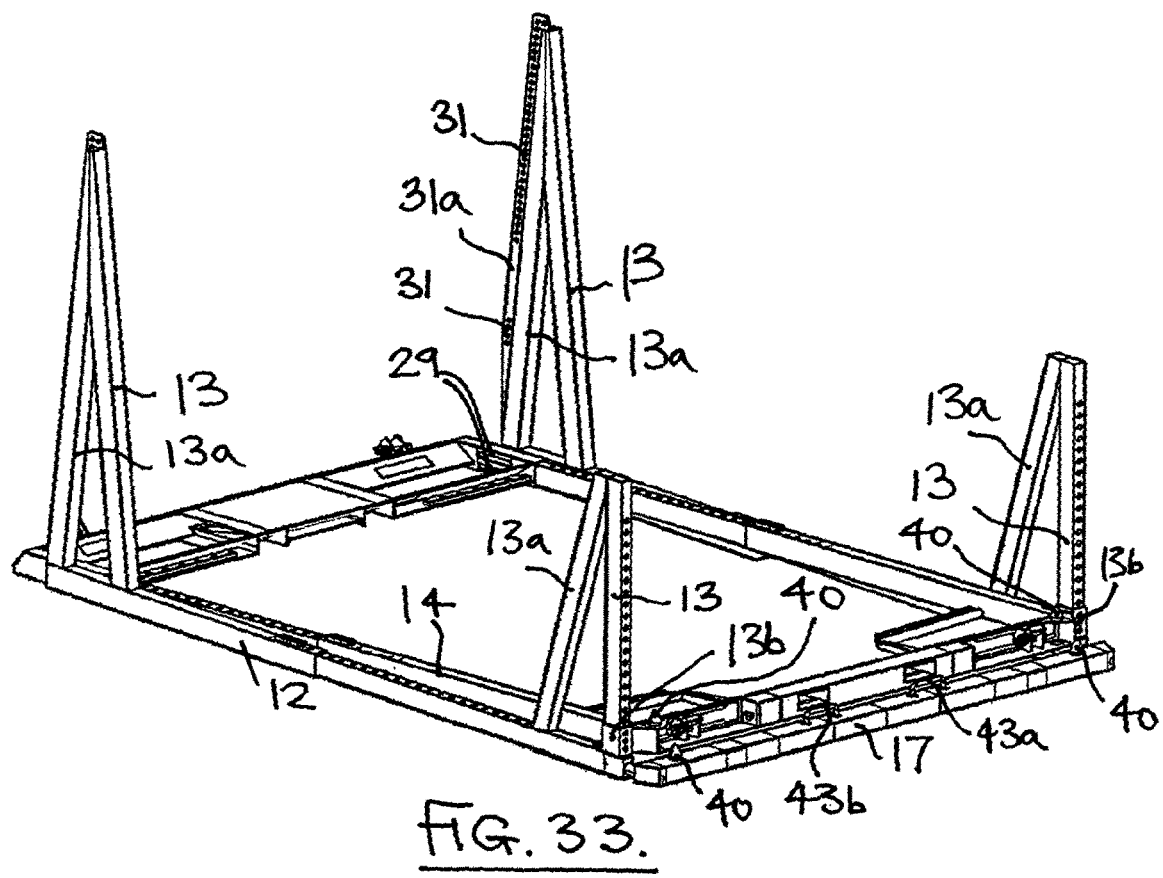
FIG. 33 shows a perspective view of part of an alternative form of vehicle support structure in accordance with the present invention.
Figure 34:
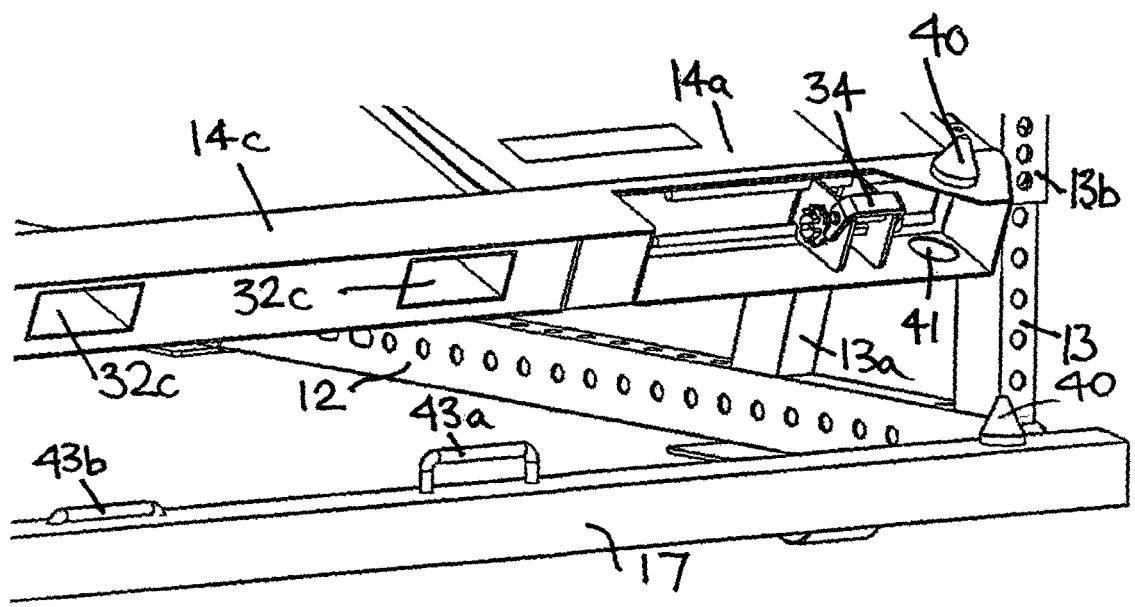
FIG. 34 shows a perspective view of part of one end of the structure of FIG. 33.
Figure 36A:
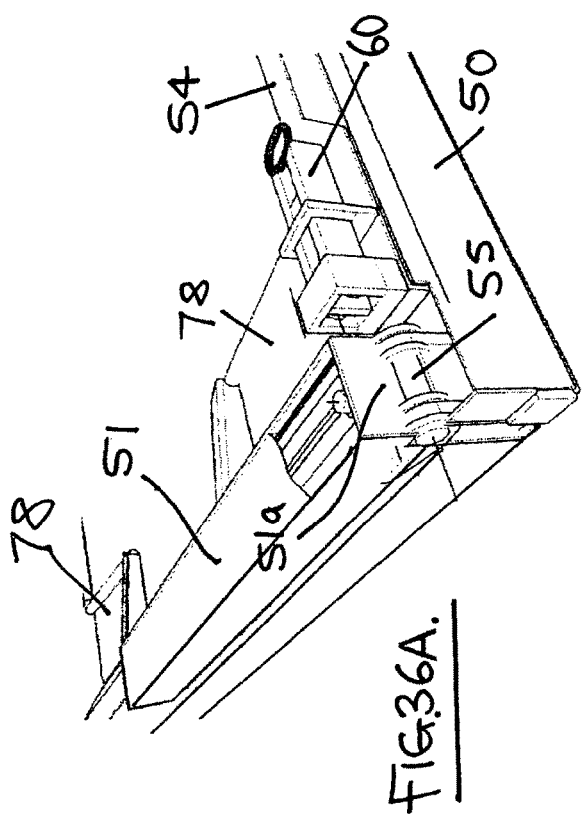
FIGS. 36A to 36D show perspective views of a corner of the structure shown in FIG. 35 showing the folding of one of the corner posts transversely.
Figure 36C:
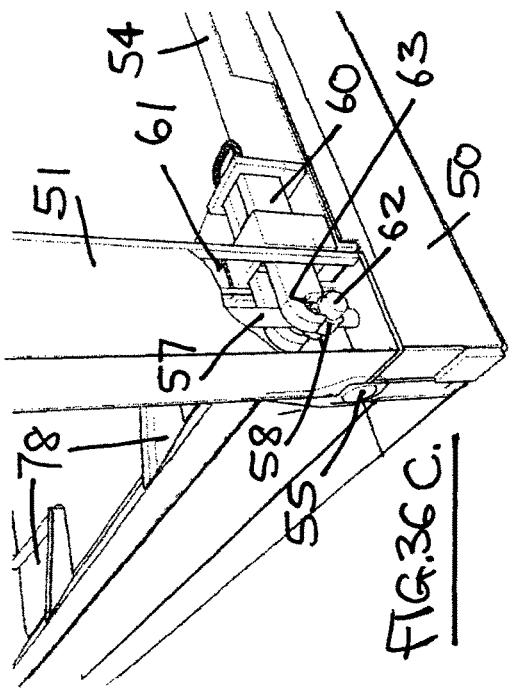
Figure 36B:
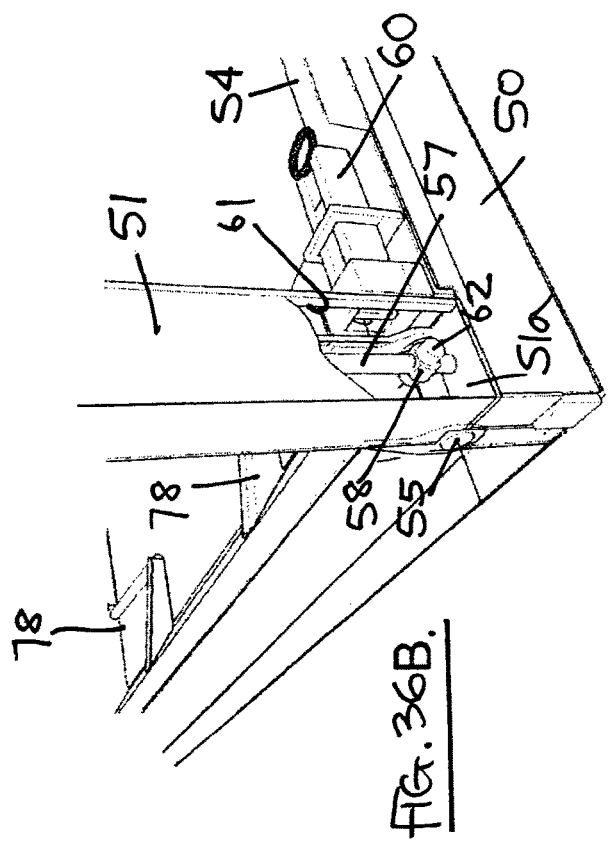
Figure 36D:
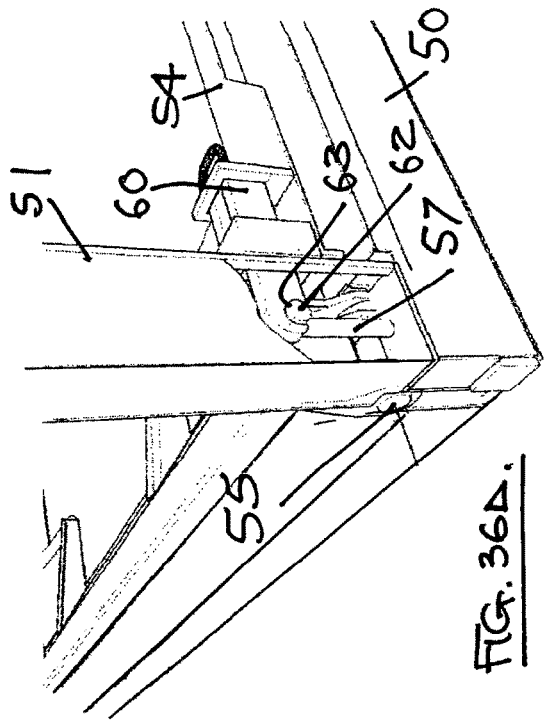

FIGS. 33 and 34 show an alternative support frame structure in which vertical posts 13 are provided with bracing struts 13*a*. Upper frame 14 is shown resting inside base frame 12 and ready to slide up and down post 13 on sleeves 13*b* at one end and has slots 29 arranged to receive bolts 30 which also engage holes 31 provided on flanges 31*a* on the other struts 13*a*. As can be seen in FIG. 34 the cross member 14*c* of the upper frame has forklift sockets 32*c* and locating projections 40 and apertures 41 which can cooperate with corresponding projections and apertures on the base frame 12 and lower frame 15 to locate the frames relative to each other when the support structure is collapsed for transportation. The cross member 17 of the base frame 12 also has forklift tine sockets 43*a* and 43*b*, socket 43*a* being shown in its operative extended position and socket 43*b* in its more compact collapsed position.

FIGS. 35 to 38 show a still further form of support frame structure in accordance with the present invention in which a base frame 50 has main corner posts 51 at the end of the base frame nearest to the closed end of the container in which the vehicles are to be transported and strut corner posts 52 at the other end of the base frame. Main posts 51 shown here fold transversely when the frame is collapsed for transportation and strut posts 52 fold longitudinally (see FIGS. 36 and 37). Main posts 51 are designed to resist vertical longitudinal and transverse loading imposed on the base frame 50 by a vehicle supported on the upper frame 54 whose wheels are outlined at 49. The strut posts 52 are less robust and mainly support only the vertical loading imposed on the base frame 50 by the upper vehicle.

Main posts 51 are here shown pivoted transversely on the base frame 50 via robust hinges 55 and when the posts 51 are raised to their vertical position the bottoms 51*a* of posts 51 contacts the side members 56 of the base frame to provide additional resistance to the movement of the posts relative to the side members. The hinges 55 are designed typically to withstand a longitudinal shunt of an upper car weighing 2500 Kg raised one meter high at an acceleration of 2.6 g. FIGS. 36A to 36D show that each post 51 includes an internal screw and nut mechanism in which a vertical screw 57 on which a raising nut 58 is engaged can be rotated by turning a nut 59 at the top of each post 51 using, for example a socket powered by an electric drill or manually using a spanner. Rotating this nut 59 causes the raising nut 58 to move up or down the screw 57 depending on the direction of rotation of the nut 59. The upper frame 54 is connected with the raising nuts 58 by latches 60 which, when the posts 51 are in their vertical position can extend through a slot 61 in the side of each post to engage projections 62 on nuts 58 with forks 63 on latches 60 (see FIGS. 36C and 36D). This engagement of the forks 63 with the projections 62 not only connects the upper frame with the raising nuts 58, allowing the end of the upper frame to be raised and lowered by rotating nuts 59, but also restricts the movement of the posts transversely relative to the base frame 50 as the latches 60 extend through the post slots 61. The pitch of the thread of screw 57 is such that no further locking is required to prevent the screw loosening and allowing the raising nut 58 to lower the upper frame during of the upper vehicle. Other forms of raising means for raising the upper frame relative to the base frame can be used instead of using forklifts. For example, chain hoists, hydraulic rams or electric motors could installed on the corner posts.

Figure 37A:
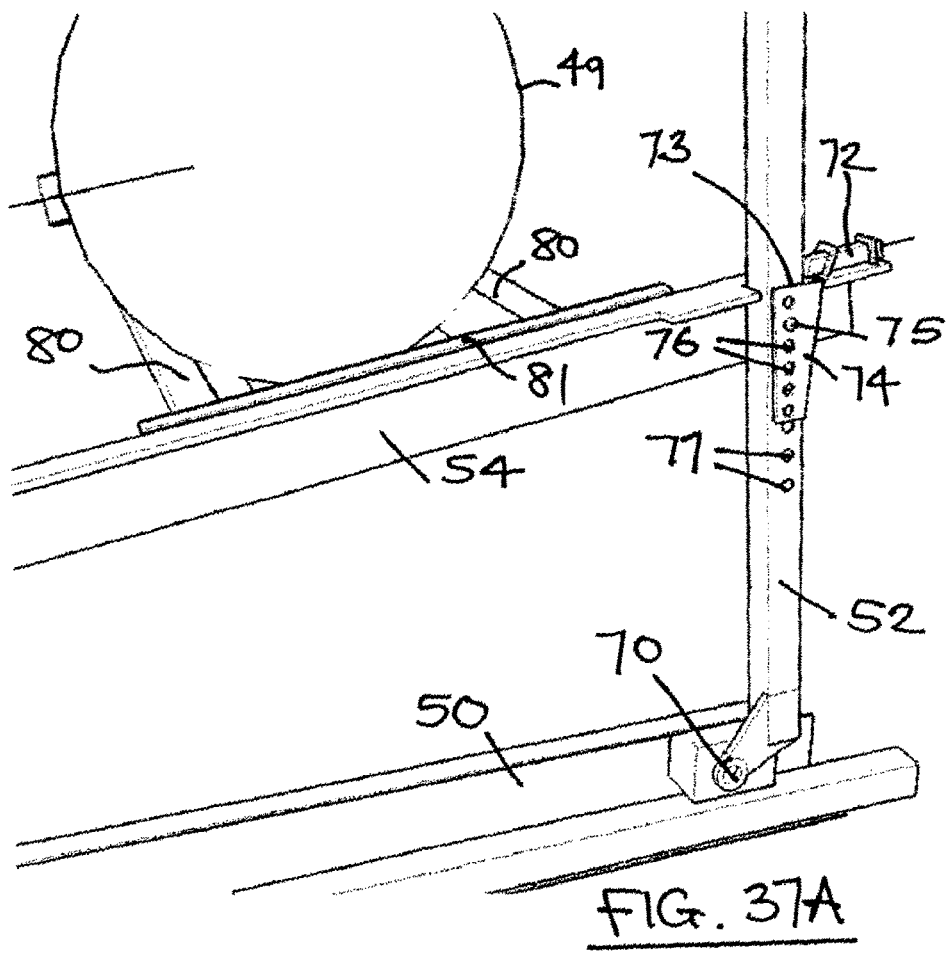
FIGS. 37A and 37B show perspective views of another corner of the structure shown in FIG. 35 showing the folding of one of the corner posts longitudinally.
Figure 37B:
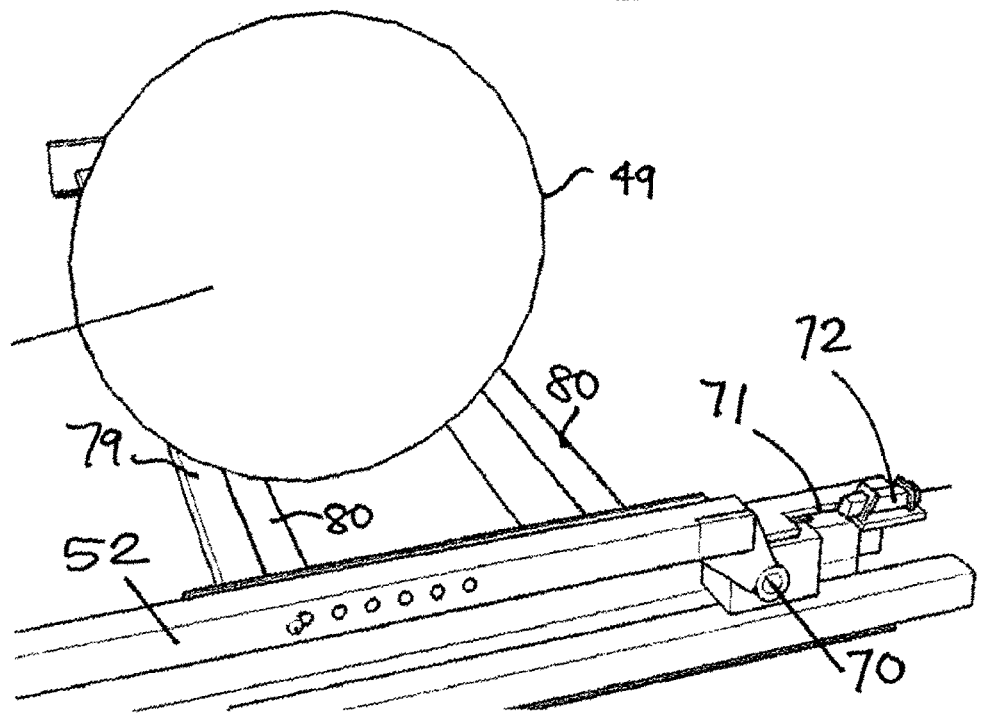

The other pair of posts, strut posts 52 at the other end of the base frame fold longitudinally on pivot pins 70 (see FIGS. 37A and 37B). When the strut posts 52 are raised to their vertical positions they pass into cut outs 71 provided in the end of the upper frame side members. The upper frame is provided with spring loaded latches 72. FIG. 37A shows the end of the upper frame 54 which has been raised to its transport position by a forklift and shows the spring loaded latches 72 engaged above shoulders 73 provided on tapering shoes 74 which have previously been position at the required height on posts 52 using a pins 75 extending through holes 76 and 77 in the shoes and posts respectively. The holes in the posts and shoes are set in vernier location to provide fine adjustment and minimise the number of holes required in the posts. The spring loaded latches 72 are pressed in as they travel up the tapering shoes 74 and then snap in above shoulders 73 to prevent the upper frame being lowered without the latches 72 being manually withdrawn from above shoulders 73 against their spring loading. This provides a semi-automatic fastening of this end of the upper frame in its required transport position (see FIG. 42). A second tapering shoe 74 can be provided on each post 52 at a lower height if needed as a safety stop during lifting of the upper frame.

In this support frame construction the upper frame 54 has integrally formed wheel support areas 78 at one end and the other pair of wheel support areas are provided by a wheel dolly frame 79 which has spaced cross members 80 which support the other pair of vehicle wheels. The wheel dolly 79 has flanges 81 which slide along the side members of the upper frame 54 and can be secured to the side members at the required position to cater for vehicles of different wheel bases using pins bolts or other fasteners. The lower frame of this version of the support structure can also be provided by one or two separate wheel dollys 79 provided with castors, rollers or skids to assist in moving the lower vehicle into its transport position within the base frame. The wheel support areas 78 and the wheel dollys 79 are also provided with lashing points and lashing straps etc to enable the wheels mounted on these components to be lashed in position. The Applicant's copending PCT patent application No. WO2017/129934, for example, describes and claims wheel dollys which, with some modification to fit between the side members of the upper frame and base frame, could be used as the dollys 79 of the present invention.

In an alternative configuration the main posts 51 may fold longitudinally relative to the base frame and the strut posts 52 may also fold longitudinally or transversely relative to the base frame.

Figure 39:
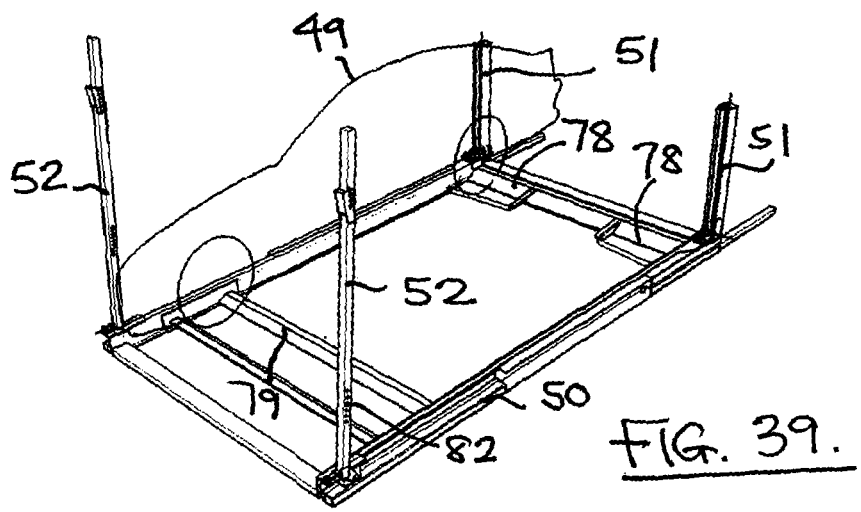
FIGS. 39 to 42 show perspective views of the support structure at different points in the vehicle loading process.
Figure 40:
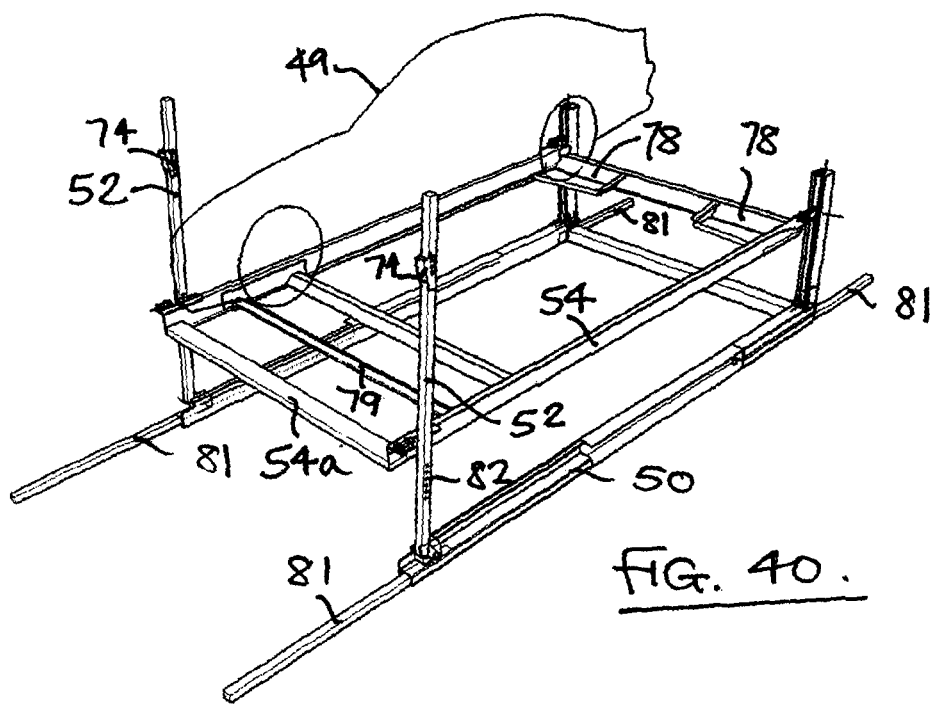
Figure 41:
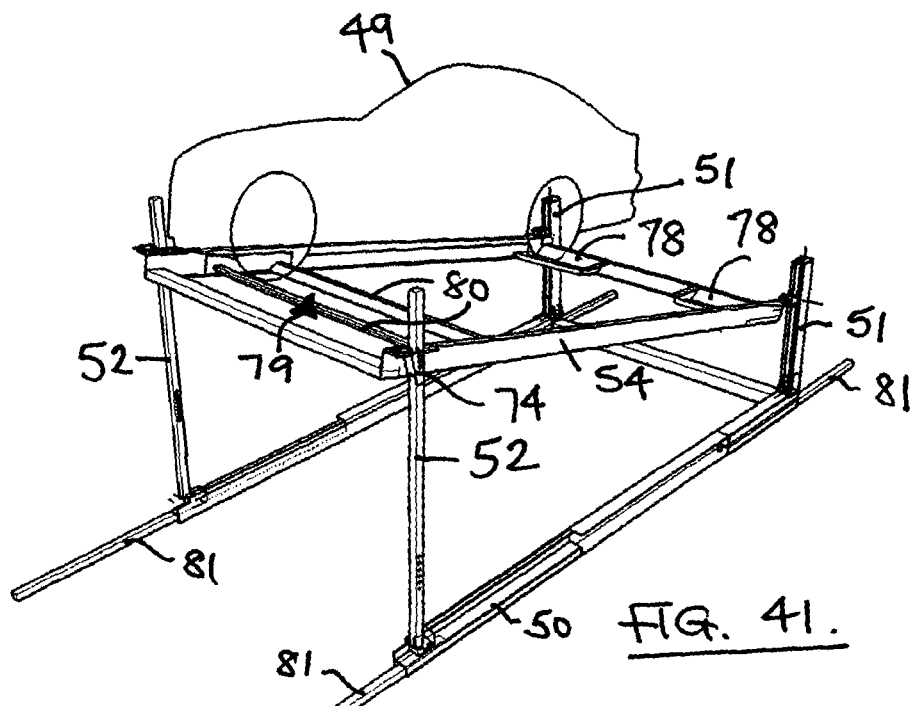
Figure 42:
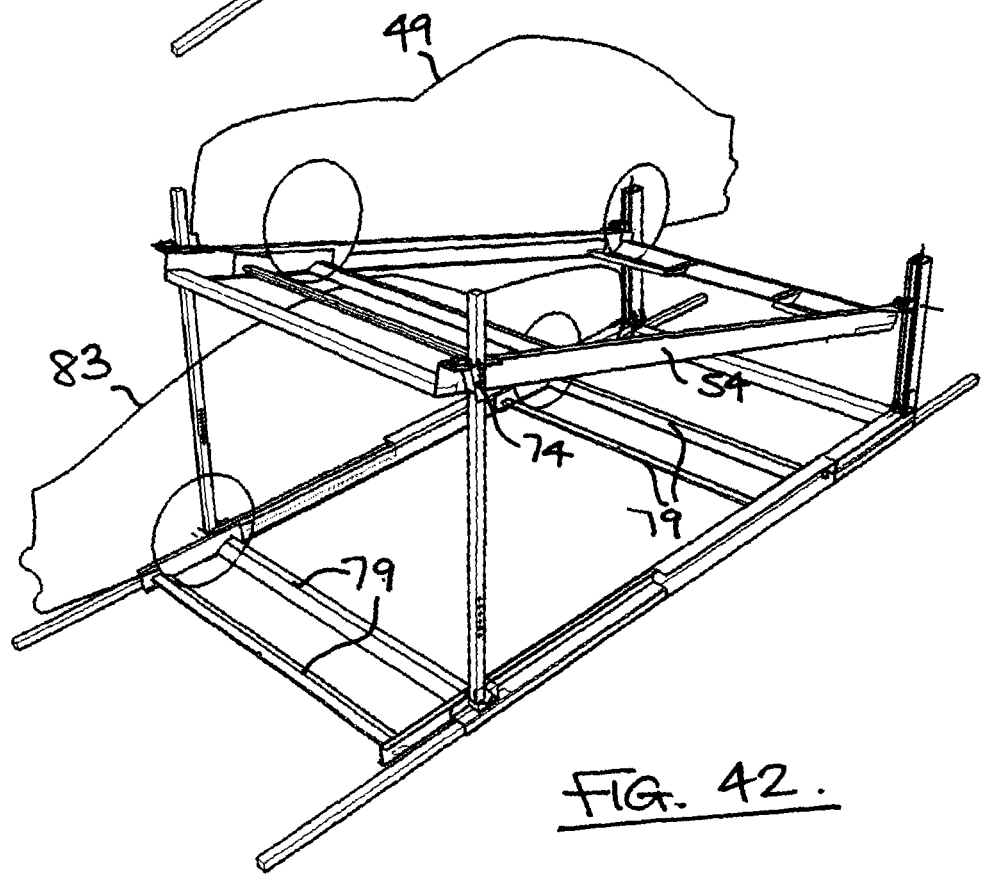
Figure 38:
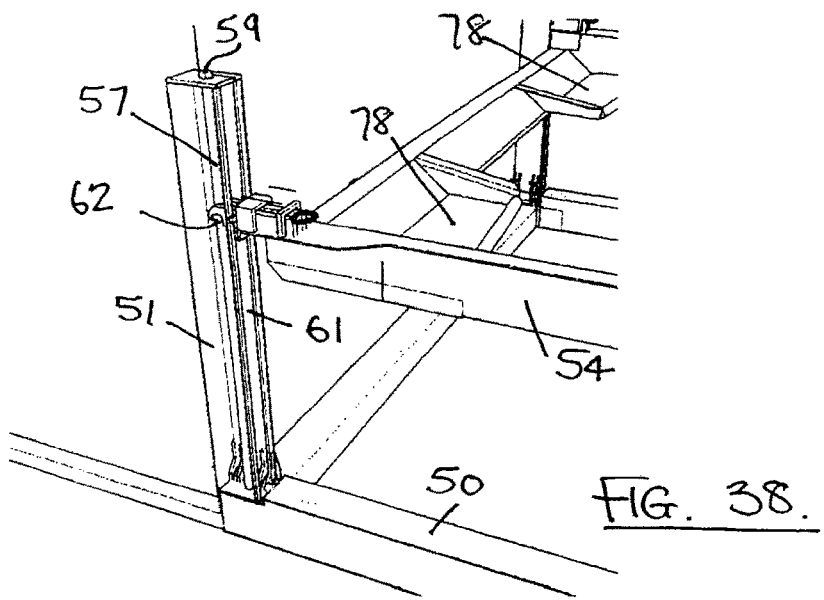
FIG. 38 shows the same corner of the structure shown in FIGS. 36A to 36D with the upper frame raised further up the post.

FIGS. 39 to 42 show the support structure in various positions during loading with the upper and lower vehicles which are to be transported. In FIG. 39 the corner posts 51 and 52 have been unfolded vertically and the moveable wheel dolly 79 of the upper frame 54 has been positioned at the required position depending on the wheel base of the upper vehicle 49 (shown in outline only) to be transported. The upper vehicle 49 is then reversed onto the upper frame 54 and lashed to the wheel support areas 78 and dolly 79. Note that the cross rail of the upper frame 54 and the wheel supports areas 78 are arranged to lie close to the floor or indeed upon it when the upper frame is lowered so that most vehicles can to be driven on and off them without need of ramps. The depth of the upper frame cross rail, wheel dolly and wheel support areas is typically less than 60 mm. Furthermore in this position the latches can slide easily through the slots and over the nuts into the posts, and provide a secondary safety feature in that the posts cannot now be accidentally knocked by virtue of the latches blocking post hinge movement. With the support frame still outside the container, or at least sufficiently close to entrance to the container for the nuts 59 of the vertical screws 57 to be reached by a loading operative, the upper vehicle 49 is then raised on corner posts 51 using the vertical screws 57 so that the rear of the upper vehicle is now at its intended transport height above the base frame 50. It is ensured that locating struts 81 are extended from the ends of the base frame 50. These struts 81 are held in their extended position by pins (not shown) pushed through an array of holes (not shown) in the top of each strut which stop each strut sliding back inside each base frame member when impacted. These struts 81 locate the support frame longitudinally to front and/or rear within the container, either by contact with the end walls, doors, door posts or front posts of the container or contact with similar struts 81 on adjacent base frames, ensuring that the vehicle will not contact the walls of the container or any adjacent vehicle in the container (see FIG. 40). It can be appreciated that the longitudinal location of the upper vehicle can thus be adjusted relative to the overall length of the base frame with its deployed struts, and that the overall length of the base frame with its deployed struts can be adjusted as required. Therefore containers of differing lengths such as 20 ft, 25 ft, 40 ft, 45 ft, 48 ft, 53 ft can be filled with a continuous chain of support structures whose deployed struts contact each other to rigidly locate the support structures within the container against longitudinal movement within the container. Also the use of struts 81 enables a vehicle to be loaded onto the support structure outside the container and then pushed into its transport position within the container without the need to use internal fastenings or lashings between the support structure and the container to locate the support structure relative to the container. This speeds up the loading of vehicles into the container. This use of struts 81 can also be used in the structure shown in FIGS. 1 to 34 of the present invention.

The front of the upper vehicle 49 is raised on corner posts 52, using a forklift truck with its tines engaged below cross member 54a of the upper frame 54, to a temporary height clear of the base frame but not at its intended transport height so that the vehicle can easily pass under the cross member extending across the doors of the container. A lower series of holes 82 are provided on posts 52 for temporarily securing a shoe 74 (not shown here) and thus the upper vehicle 49 relative to posts 52 during loading of the support frame and upper vehicle into the container.

When the support frame and upper vehicle has been pushed into the container by the forklift with its tines engaged under cross member 54a, the upper vehicle 49 is raised to its full transport height on posts 52 (see FIG. 41) as described above using tapering shoes 74 and cooperating spring loaded latches 72. The lower vehicle 83 is driven onto and lashed onto wheel dollys 79 and then pushed manually or by a forklift into its transport position within base frame 50. The lower dollys are then secured to the side rails of base frame 50 to locate the lower vehicle relative to the support structure.

If only one wheel dolly 79 is used for the lower frame, the front wheels of the lower vehicle are loaded onto and lashed onto this single dolly and the rear wheels of the lower vehicle 83 are then raised by a forklift and the lower vehicle is then pushed into its transport position within the base frame 50.

No forklift sockets are provided on the base frame or upper frame of the support structure and it is envisaged that the forklift tines if required can be fitted with a known connecting device to facilitate engagement with a convenient frame cross member and prevent sliding of the tines relative to the cross member.

Figure 43:
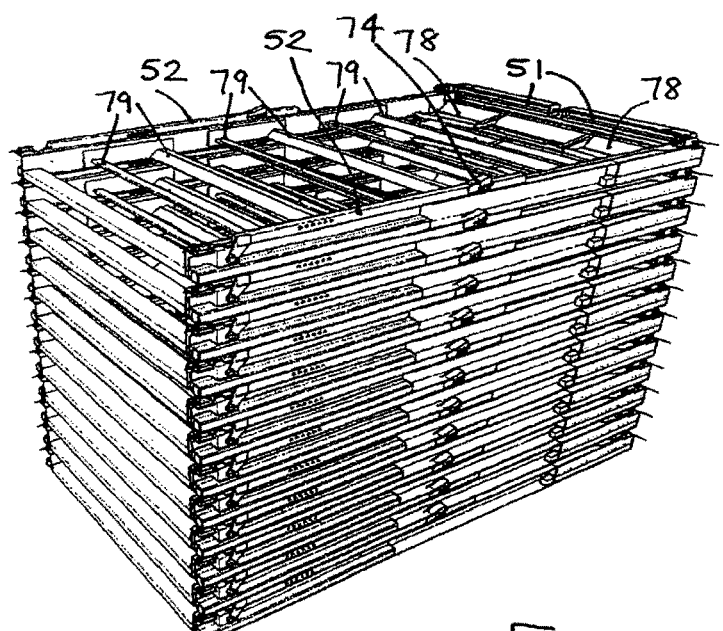
FIG. 43 shows a perspective view of a column of collapsed support structures for loading into a shipping container for transportation.

FIG. 43 shows a column of support structures as shown in FIGS. 35 to 42 in their collapsed transport configuration ready for transportation on a standard shipping container. The length, in a longitudinal sense relative to the shipping container, of the individual support structures is such that three such columns can be loaded end to end in a standard 40 foot shipping container without the need to make the base frame, upper frame or lower frame of the support structure telescopic. As can be seen from FIGS. 39 and 43 the upper frame 54 rests within the base frame 50 and wheel dollys used on the upper and/or lower frames can be conveniently stored between the side members of the upper frame as the lower frame has no longitudinally extending side members. Thus the vertical depth or stack height of the collapsed support structure is shallow allowing up to 13 collapsed support structures to be stacked one on top of the other whilst still being loadable through the doorway of a standard 9 ft 6 inch high shipping container using a forklift and rollers on the front end of the base frame. If the three columns of collapsed support structures are loaded into a container more than 40 ft long the struts 81 on one or more of the bottom most support structures can be deployed to stop movement of the columns within the container. Also, as the upper frame is already positioned inside the base frame it is immediately ready to be loaded with the upper vehicle once the wheel dollys which form the lower frame have been removed. Thus as the upper frame does not need repositioning prior to loading of the upper vehicle there is no need for rollers on the upper frame.

The present invention thus provides several forms of vehicle support structure which are both safe to operate as all the loading of the vehicles onto the support structure can be done without the loading operative having to venture under a raised vehicle. Also the support structure can be collapsed for transport back to the home port in a very compact form which significantly reduces the return transport costs of the structure which renders the structure significantly more economic to operate.

The vernier-like adjustment of the side members 16 and 19 and support sleeves 13a described above can also be used to control the effective length of other telescoping components in different vehicle support structures and also in applications other than vehicle support structures.

Figure 44:
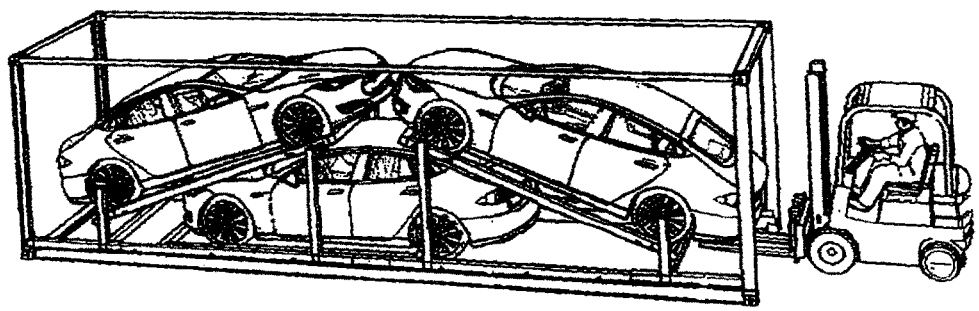
FIG. 44 shows an alternative loading configuration for three vehicles in shipping container.

It is envisaged that the various support structures described above frames can be used in forward or backward configurations so that should they can be used as described for an upper and lower vehicle, and then another upper vehicle be loaded on a reversed frame so that when pushed into the container it is supported above and over the lower vehicle. In this way odd numbers of vehicles can be transported compactly within the container and the lower vehicle can be longer and the vehicles can be up to 20% taller. FIG. 44 shows such a reversed arrangement for loading three cars in a 40 ft standard container.

It is further envisaged that where the support structures can be carried in open sided containers and trailers, the posts carrying the upper car can be made robust enough to support transverse loads or where not so are strapped diagonally to the base side rails to provide transverse strength and rigidity. Where the open sided containers and trailers are loaded by fork lift trucks from the side, fork lift trucks can engage with the base side rails to lift the whole frame and one or two cars up and insert them sideways in through the open side.

As will be appreciated many of the features disclosed above in relation to the constructions shown in FIGS. 1 to 34 can be used in the constructions shown in FIGS. 35 to 44 and vice versa. For example, the roller arrangement shown in FIGS. 30A and 30B and the vernier-like type of telescopic adjustment shown in FIGS. 23 and 24A to 24C can be used in the structures shown in FIGS. 35 to 44 and the vertical screw and nut raising mechanism of FIGS. 36A to 36D (or some other suitable raising means) could be used in the structure shown in FIGS. 1 to 34 to raise the upper frame relative to the base frame.

The invention claimed is:

1. A structure for supporting vehicles one above the other during transport or storage, the structure comprising a base frame having corner posts that in use support an upper frame on which an upper vehicle can be supported in an elevated transport position above a lower vehicle, the upper frame being guided up the corner posts when the upper vehicle is raised to the elevated transport position and support means associated with the corner posts for fastening the upper frame in the elevated transport position relative to the corner posts, wherein the structure is transportable in a collapsed state when not in use with the corner posts being secured to longitudinally extending side members of the base frame and folding down transversely by rotating the side members and corner posts inwardly relative to a cross member of the base frame so that the corner posts and side members lie substantially in a horizontal plane containing the side members when the structure is collapsed in order to occupy less space when not in use with the frames in a nested configuration.

2. The structure according to claim 1, wherein the structure further comprises one or more separate lower frames arranged to be positioned within the base frame when in use on which the lower vehicle can be supported; and
   wherein at least one of the one or more lower frames can be moved to a location outside the base frame and then loaded with the lower vehicle and moved to a location within the base frame for transportation.

3. The structure according to claim 2, wherein the lower frame has longitudinally extending side members between which wheel support areas for front and rear wheels of the lower vehicle extend, the longitudinal spacing between the wheel support areas for the front and rear wheels of the lower vehicle being adjustable.

4. The structure according to claim 2, wherein at least one frame selected from the group consisting of the base frame, the upper frame and the one or more lower frames is longitudinally telescopic.

5. The structure according to claim 4, wherein the structure comprises at least two longitudinally telescopic frames; and
   wherein an adjustment of an effective length of one or more of the longitudinally telescopic frames is provided by bolts or pins which extend through one of an array of adjacent holes in a first of the at least two longitudinally telescopic frames and a chosen one of a series of differently spaced holes in a cooperating second of the at least two longitudinally telescopic frames to give fine adjustment of the effective length of the one or more longitudinally telescopic frames.

6. The structure according to claim 1, wherein the base frame has four of the corner posts; and
   wherein a first end of the upper frame is pivotally mounted on a first pair of two corner posts of the four corner posts by the support means in the form of sleeves which slide up and down the first pair of corner posts; and
   wherein the sleeves have sleeve holes through which bolts or pins can extend into corner post holes provided in sides of the first pair of corner posts to allow adjustment of a vertical position of the first end of the upper frame on the first pair of corner posts.

7. The structure according to claim 6, wherein the first end of the upper frame is pivotally mounted on the first pair of corner posts by two hooks on the first end of the upper frame which are hooked around a projection extending from each respective sleeve.

8. The structure according to claim 6, wherein the second end of the upper frame has one or more slots through which bolts or pins can extend into holes provided in sides of a second pair of the four corner posts to allow adjustment of a vertical position of the second end of the upper frame on the second pair of corner posts.

9. The structure according to claim 6, wherein the bolts or pins extend through one of an array of sleeve holes provided in each respective sleeve and a chosen one of a series of differently spaced corner post holes in a respective corner post of a second pair of the four corner posts to give fine adjustment of a height of the respective sleeve on the respective corner post.

10. The structure according to claim 1, wherein the position of the cross member is adjustable longitudinally relative to the side members for locating the base frame longitudinally within a container in which the structure is being used against an end wall of the container or an adjacent vehicle support structure.

11. The structure according to claim 10, wherein each end of the cross member has a projecting arm which extends longitudinally inside an end of an adjacent side member of the side members of the base frame to allow the longitudinal position of the cross member to be adjusted dependent on the depth of insertion of the projecting arms into the side members, the side members rotating inwardly on the projecting arms when the structure is collapsed.

12. The structure according to claim 1, wherein the structure is located longitudinally relative to a container in which the structure is being used by a first transversely extending chock member which is screwed or otherwise secured to a floor of the container.

13. The structure according to claim 1, wherein the structure further comprises a lower frame arranged to be positioned within the base frame when in use on which the lower vehicle can be supported;
wherein the lower frame can be moved to a location outside the base frame and then loaded with the lower vehicle and moved to a location within the base frame for transportation; and
wherein the lower frame is located relative to the base frame by a second transversely extending chock member which is secured between the side members of the base frame by fixings which extend through holes in the lower frame into a floor of a container in which the structure is being used.

14. The structure according to claim 1, wherein a lower frame can be moved to a location outside the base frame and then loaded with the lower vehicle and moved to a location within the base frame for transportation; and
wherein the frames of the structure are provided with rollers or wheels to allow the frames to be pushed into or pulled out of a shipping container with or without a vehicle loaded thereon.

15. The structure according to claim 14, wherein the rollers or wheels are configured such that if:
the base frame, upper frame or lower frame is resting on a flat surface, the rollers or wheels are clear of the flat surface so as to increase stability of the respective resting frame; and
if one end of the base frame, upper frame or lower frame remote from the rollers or wheels is raised clear of the flat surface, the rollers or wheels contact the flat surface so as to facilitate loading of the structure into the shipping container.

16. The structure according to claim 1, wherein the base frame has four of the corner posts; and
wherein at least two corner posts of the four corner posts of the base frame are provided with raising means for raising the upper frame.

17. The structure according to claim 16, wherein the raising means is a vertical screw and nut mechanism.

18. The structure according to claim 1, wherein ends of the side members of the base frame include telescopic extensions;
wherein when the telescopic extensions are extended out of the side members, the extended telescopic extensions contact end walls or posts of a container in which the structure is being used or telescopic extensions on adjacent support structures so as to form a continuous chain of structures whose telescopic extensions contact each other to rigidly locate the structures longitudinally within the container.

19. The structure according to claim 18, wherein the upper vehicle can be loaded onto the upper frame outside the container and the structure then pushed into the elevated transport position within the container and located longitudinally within the container by the telescopic extensions; and
wherein the telescopic extensions negate the need to use internal fastenings or lashings between the structure and the container to locate the structure relative to the container, thus speeding up loading of the container versus loading the container with a structure without the telescopic extensions.

20. The structure according to claim 1, wherein the structure further comprises a lower frame arranged to be positioned within the base frame when in use on which the lower vehicle can be supported; and
wherein the lower frame comprises one or more lower vehicle wheel support dollys which extend between the side members of the base frame and can be secured to one or more of the side members and a floor of the container.

21. The structure according to claim 20, having only one lower vehicle wheel support dolly on which front or rear wheels of the lower vehicle are secured so that the lower vehicle can be loaded into the container by raising the front or rear wheels of the lower vehicle not on the dolly of the ground using a forklift truck and then pushing the lower vehicle into the container on the one wheel support dolly.

22. The structure according to claim 20, wherein the upper frame rests inside the base frame when collapsed and the wheel dollys rest between side members of the upper frame to reduce stack height of the collapsed structure.

23. The structure according to claim 1, wherein the upper frame has side members extending longitudinally of the structure and no cross beams extending between its side members at locations between wheel support areas for one or more wheels of the upper vehicle so that any vehicle or other cargo located below the upper frame can nest between the upper frame side members of the structure.

24. The structure according to claim 1, wherein the structure further comprises one or more lower frames arranged to be positioned within the base frame when in use on which the lower vehicle can be supported; and
wherein the structure is designed to be collapsed with the upper, lower and base frames stacked one above the other.

25. The structure according to claim 24, wherein the structure further comprises one or more locating projections and one or more recesses or apertures; and wherein the locating projections located on one of the stacked upper, lower and base frames of a collapsed structure are configured so as to engage the cooperating recesses or apertures in an adjacent other one of the stacked upper, lower and base frames of the collapsed structure so as to prevent movement of the stacked frames.

26. The structure according to claim 24, wherein the collapsed and stacked structure is configured such that:

a series of such collapsed and stacked structures can in turn be stacked one on top of another so as to form a column; and a series of such columns can in turn be stacked one beside another in a shipping container for transport.

27. The structure according to claim 1, wherein when loaded with an upper vehicle, the height of the upper frame can be adjusted on the corner posts, and an overall length of the side members of the base frame can be adjusted when located inside a container in which the structure is being used without requiring any person to work under the upper vehicle.

28. The structure according to claim 1, wherein the upper frame has longitudinally extending side members between which wheel support areas for front and rear wheels of the upper vehicle extend, the longitudinal spacing between the wheel support areas for the front and rear wheels of the upper vehicle being adjustable.

29. The structure according to claim 28, wherein the wheel support areas for one end of the upper frame are fixed between the longitudinally extending side members, and the wheel support areas at the other end of the upper frame are provided by a longitudinally moveable wheel dolly frame which extends transversely between, and is secured to, the side members of the upper frame.

30. The structure according to claim 1, wherein the structure is located longitudinally relative to a container in which the structure is being used by fixings which extend through holes in or carried by the side members of the base frame.

* * * * *